(12) United States Patent
Ota et al.

(10) Patent No.: US 8,045,288 B2
(45) Date of Patent: Oct. 25, 2011

(54) TAPE DRIVE WITH CARTRIDGE THICKNESS DETECTING SENSORS

(75) Inventors: Kenji Ota, Ibaraki (JP); Keiji Ban, Ibaraki (JP); Kosuke Amano, Ibaraki (JP); Toshiro Nishiwaki, Ibaraki (JP); Yasuo Inukai, Ibaraki (JP); Akihiro Yasui, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 1204 days.

(21) Appl. No.: 10/578,517

(22) PCT Filed: Nov. 10, 2004

(86) PCT No.: PCT/JP2004/016674
§ 371 (c)(1),
(2), (4) Date: May 8, 2007

(87) PCT Pub. No.: WO2005/045824
PCT Pub. Date: May 19, 2005

(65) Prior Publication Data
US 2007/0274001 A1    Nov. 29, 2007

(30) Foreign Application Priority Data

Nov. 11, 2003   (JP) .................................. 2003-381010
Nov. 14, 2003   (JP) .................................. 2003-385799
Nov. 14, 2003   (JP) .................................. 2003-385800
Jan. 16, 2004   (JP) .................................. 2004-008888

(51) Int. Cl.
*G11B 15/00*   (2006.01)
*G11B 17/04*   (2006.01)
(52) U.S. Cl. .......................................... 360/90; 360/94

(58) Field of Classification Search .................... 360/90, 360/92.1, 93, 94, 96.51, 96.61
See application file for complete search history.

(56) References Cited

U.S. PATENT DOCUMENTS 5,311,030 A * 5/1994 Higuchi et al. .......... 250/559.29
5,343,338 A   8/1994 Murata et al.
(Continued)

FOREIGN PATENT DOCUMENTS
JP    3-156767 A    7/1991
(Continued)

OTHER PUBLICATIONS

English translation of JP-2002-15492-A, Jan. 18, 2002.
(Continued)

*Primary Examiner* — Daniell L Negron
*Assistant Examiner* — Carlos E Garcia
(74) *Attorney, Agent, or Firm* — Birch, Stewart, Kolasch & Birch, LLP

(57) ABSTRACT

The present invention is directed to provide a tape drive capable of securely pressing and holding a thin-type or a thick-type loaded tape cartridge being different in case thicknesses, so as to be vertically immovable.
The tape drive D accommodates within it a loading frame 28 for receiving and supporting each tape cartridge 40A, 40B being different in case thicknesses and a holder 29 for holding the tape cartridge 40A, 40B by pressing the cartridge. The side wall 31 of the loading frame is provided with a pair of upper and lower sensors 34, 35 for identifying the thin-type and the thick-type loaded tape cartridges. The holder 29 is displaced to a height position matching with the loaded tape cartridge 40A, 40B based on the tape cartridge size detected by the sensors 34, 35.

3 Claims, 19 Drawing Sheets

U.S. PATENT DOCUMENTS

| | | | |
|---|---|---|---|
| 5,479,312 A | 12/1995 | Masuda et al. | |
| 5,730,379 A | 3/1998 | Miyamoto | |
| 5,793,565 A * | 8/1998 | Suzuki | 360/94 |
| 5,956,202 A * | 9/1999 | Suzuki | 360/94 |
| 6,046,880 A * | 4/2000 | Markus | 360/99.06 |
| 6,456,462 B1 * | 9/2002 | Ota et al. | 360/132 |

FOREIGN PATENT DOCUMENTS

| | | |
|---|---|---|
| JP | 3-228251 A | 10/1991 |
| JP | 3-286490 A | 12/1991 |
| JP | 4-305856 A | 10/1992 |
| JP | 4-315857 A | 11/1992 |
| JP | 5-217328 A | 8/1993 |
| JP | 5-250841 A | 9/1993 |
| JP | 7-006558 A | 1/1995 |
| JP | 7-098913 A | 4/1995 |
| JP | 7-130059 A | 5/1995 |
| JP | 8-315473 A | 11/1996 |
| JP | 9-007342 A | 1/1997 |
| JP | 9-007344 A | 1/1997 |
| JP | 11-273301 A | 10/1999 |
| JP | 2002-015492 A | 1/2002 |
| JP | 2003-248990 A | 9/2003 |

OTHER PUBLICATIONS

English translation of JP-7-130059-A, May 19, 1995.
Notification of Reasons for Refusal dated May 12, 2010 in corresponding Japanese Application No. 2004-325036.

* cited by examiner (a)

(b)

(First Embodiment)

(First Embodiment)

(First Embodiment)

(First Embodiment)

(First Embodiment)

(First Embodiment)

(a)

(b)

(First Embodiment)

(First Embodiment)

(a)

(b)

(First Embodiment)

(Second Embodiment)

(Second Embodiment)

(Second Embodiment)

(Second Embodiment)

(Third Embodiment)

(Third Embodiment)

(Third Embodiment)

(Third Embodiment)

(Forth Embodiment)

(Forth Embodiment)

(Forth Embodiment)

(Fifth Embodiment)

(Fifth Embodiment)

TAPE DRIVE WITH CARTRIDGE THICKNESS DETECTING SENSORS

TECHNICAL FIELD

The present invention relates to a tape drive which is applicable in common for recording and reproducing thin-type and thick-type tape cartridges with different vertical thickness dimensions.

BACKGROUND ART

Recently, as a record medium has been frequently used a digital data storage (referred to as a tape cartridge, hereinafter) which is preferable for back-up of small and medium-sized data and smaller in size and lower in cost in comparison with other record media. The tape cartridge has been specialized for a computer data and developed so that a record capacity can be increased by extending a tape length with thinning a thickness of the tape and/or by improving a record format. As a part thereof, a thick-type tape cartridge employing a wider tape in comparison with a conventional thin-type tape cartridge is being used. Though the thick-type tape cartridge becomes thicker in its case thickness by an increased width in comparison with the thin-type tape cartridge, other basic constructions including a fore and rear case size and a left and right case size are substantially the same.

Though the recording and reading out of information data in the tape cartridges having different vertical thicknesses of their cases as mentioned above are generally carried out by their dedicated tape drives, such a tape drive device as being capable of recording and reading out data in any tape cartridge having different outside shapes by only one tape drive device is known to public in the Patent Document 1. According to the device disclosed in the Patent Document 1, a plurality of tape drives corresponding to the tape cartridges with different outside shapes are installed within a main body so that a subject tape cartridge for recording and reading out can be driven by a suitable tape drive.

The present invention is intended to provide a tape drive which is capable of recording and reading out for a thin-type and a thick-type tape cartridges in common with both. But, a compatible arrangement of these tape cartridges in this way itself is known to public in the Patent Document 2.

Further, such a tape drive is known to public in the Patent Document 3, which has a normally-closed door for a cartridge loading mouth, which can be made to swing toward inside of the tape drive for withdrawal interlockingly with a loading operation of the tape cartridge. Thereupon, it is also known to public in the Patent Document 4, to provide a cartridge loading mouth with a plurality of doors for opening and closing the mouth. Incidentally, in this case, the loading mouth of the drive device is devised to be opened and closed by the plurality of doors for preventing the erroneous loading of a disk cartridge having a wrong thickness.

In the tape cartridge according to the Patent Document 2, in order to absorb a difference between thicknesses of large and small tape cartridges, a recessed portion is formed in a bottom surface of the thick-type tape cartridge. In a condition that the thin-type and the thick-type tape cartridges are loaded within the same tape drive, the recessed portion is defined as a positioning reference for the thick-type tape cartridge, and the bottom surface of the lower case is defined as a positioning reference for the thin-type tape cartridge, so that top levels of the tapes of the thin-type and the thick-type tape cartridges within the tape drive can be maintained constant so as to share upper and lower positions of the tape traveling path.

In the tape cartridge according to the Patent Document 5, the center of the traveling of the tape within the tape drive is defined as a reference position, and memory elements to be arranged in the thin-type and the thick-type tape cartridges respectively are located at the positions spaced apart by the same distance from the reference position. Specifications and properties of the tape, data including settings of devices at the time of filming or the likes are stored in the memory elements.

According to the present invention, a main body of the tape drive is provided at a middle of its front surface with a pocket defined by portions of its upper and lower surfaces and its front surface for loading a tape. This pocket is opened by a shutter adapted to slide in the fore and rear directions along the lower surface of the main body case as well as a front lid swingably supported by the main body case. A tape cartridge employing such an openable and closable pocket is known to public as a DAT tape cartridge disclosed in the Patent Document 6, the Patent Document 8 and so on. The front lid comprises a front face plate for covering a front opening of the pocket along a left and right direction and connection pieces integrally connected thereto so as to extend rearward in the case from left and right ends of the front face plate, so that front lid can be pivotally supported so as to be opened upward about supporting shafts projected inward oppositely to each other from the inside surfaces of the connection pieces between a closed posture for closing the pocket and an opened posture for opening the front surface of the pocket by its raising position above the upper surface of the pocket.

Patent Document 1: JP Laid Open Publication No. 2002-15492 (paragraph 0015, FIG. 1)

Patent Document 2: JP Laid Open Publication No. 5-250841 (paragraph 0024, FIG. 1)

Patent Document 3: JP Laid Open Publication No. 8-315473 (paragraph 0030, FIG. 6)

Patent Document 4: JP Laid Open Publication No. 7-98913 (paragraph 0020, FIG. 3)

Patent Document 5: JP Laid Open Publication No. 7-65583 (paragraph 0020, FIG. 1)

Patent Document 6: JP Laid Open Publication No. 9-7342 (paragraph 0024, FIG. 1)

Patent Document 7: JP Laid Open Publication No. 9-7344 (paragraph 0011, FIG. 7)

Patent Document 8: JP Laid Open Publication No. 11-273301 (paragraph 0015, FIG. 2, FIG. 5)

DISCLOSURE OF INVENTION

Problems to be Solved by the Invention

According to a tape drive device in which a plurality of tape drives are installed within a drive main body so that a subject tape cartridge for recording and reading out can be driven by a suitable tape drive, it is possible to record and read out information signals for any tape cartridge in such a condition that tape cartridges having different outside dimensions exist in mingled condition. But, since it is necessary to provide a dedicated tape drive for every standardized tape cartridge, it becomes indispensable to provide a carrier mechanism for carrying each tape cartridge between a storage location and a tape drive location, which results in that a whole of the device becomes complicated in arrangement and increased in cost.

When the recording and the reading out for the large and the small tape cartridges having a thick case and a thin case respectively are made possible by one tape drive in common therewith, problems as mentioned above can be solved. In this case, though a size of the storage portion for the tape cartridge is necessarily formed large based on the thick-type tape cartridge, it is apprehended that when the thin-type tape cartridge is loaded, that thin-type tape cartridge would move vertically within the storage portion. Further, since a projecting distance of the pivoting front lid for opening and closing the tape loading pocket or level positions of an entrance and an exit for the tape end detection light differ depending on the large and the small tape cartridges, it is apprehended that when the tape drive is operated in those conditions, serious troubles such as device break-down, tape cartridge breakage and so on might be caused.

Therefore, a first object of the present invention is to provide a tape drive which is capable of securely holding either of a large and a small tape cartridges having different thicknesses loaded thereto so as to be vertically immovable.

A second object of the present invention is to provide a tape drive which is capable of performing an opening and closing operation of a front lid and/or a tape end detecting operation without any hindrance even though either of a large and a small tape cartridges is loaded thereto.

When enabling the recording and the reading out for the tape cartridges having different thicknesses by one tape drive in common therewith, it is necessary to employ a large loading mouth naturally based on the large tape cartridge as a loading mouth of the tape drive. Thereby, it is expected that following problems will be caused. That is, usually the tape drive can not judge whether the tape cartridge loaded to the tape drive is a large tape cartridge or a small tape cartridge. Even if the tape drive is made to recognize a size of the tape cartridge to be loaded from now on by previously specifying the size of the tape cartridge, it is apprehended that the tape cartridge might be loaded in an upside-down condition by mistake and then the tape drive can not judge that condition. In any case, when the tape drive is operated in those conditions, serious troubles such as breakage of a device, breakdown of the tape cartridge or the likes might be caused.

Accordingly, a third object of the present invention is to provide a tape drive which can be operated only under such a condition that a tape cartridge having a suitable size is loaded thereto as well as which can surely prevent the erroneous loading of a tape cartridge such as the loading in an upside-down condition by mistake.

A fourth object of the present invention is to restrain an operation of a tape drive under such a condition that a tape cartridge having an unsuitable size is loaded thereto so that only a tape cartridge having a specified size can be loaded by previously specifying a size of the tape cartridge.

A fifth object of the present invention is to provide a tape drive which is capable of fitting a state of the tape drive in accordance with a tape cartridge by automatically judging a thickness of a case of the tape cartridge loaded from a loading mouth into a loading frame, therefore which is capable of properly and simply performing the recording and the reading out without necessity of the considering of differences between sizes of tape cartridges.

When loading the tape cartridges disclosed in the above-mentioned Patent Documents 6 and 8 into a tape drive, the front face plate of the front lid is pushed up by vertically movable pins of the tape drive so that the front lid is shifted from its closed posture to its opened posture. In the case that there is a difference between the thicknesses of the thick-type and the thin-type tape cartridges, since vertical width dimensions (vertical height dimensions in the closed posture) of the front face plates differ, circular movement traces scribed by leading ends of the front face plates pivoting about the supporting shafts differ great in the thick-type tape cartridge and the thin-type tape cartridge, so that a problem resides in limitation of the compactification of the tape drive. That is, in the thick-type tape cartridge, since a projecting distance of the pivoted front lid defined by the movement traces scribed by the front face plate and an outer surface of the front lid in the closed posture differs remarkably large from that of the thin-type tape cartridge when being compared, it is necessary to scale up stand-by positions of a reading out head and a recording head of the tape drive in accordance with the projecting distance of the pivoted front lid in the thick-type tape cartridge, which results in limitation of the compactification of the tape drive.

Accordingly, a sixth object of the present invention is to compactify a tape drive by substantially making a movement trace scribed by the front lid pivoted about a supporting shaft in a thick-type tape cartridge equal to that of a thin-type tape cartridge in the tape drive adapted to receive both the thin-type and the thick-type tape cartridges having thin and thick cases respectively.

A seventh object of the present invention is to restrain an increasing of a manufacturing cost by realizing the common-using of component parts of cases in compatible tape cartridges including a thin-type and a thick-type tape cartridges having different case thicknesses the recording and the reading out for which can be performed by the same tape drive.

Means for Solving Problems

For accomplishing the first and the second objects of the present invention, first as shown in FIG. 1 and FIG. 8, in a tape drive which is used for either of a thin-type and a thick-type tape cartridges (40A, 40B) having different case thicknesses respectively in common therewith, the tape drive (D) accommodates within it a loading frame (28) for receiving and supporting the tape cartridge (40A, 40B) loaded through a loading mouth (27) and a holder (29) for holding the tape cartridge (40A, 40B) by pressing it from above in cooperation with the loading frame (28). The loading frame (28) comprises a bottom wall (30) for supporting a lower surface of the tape cartridge (40A, 40B) and side walls (31) projected from left and right ends of the bottom wall (30) to restrain the swinging of the tape cartridge (40A, 40B) in the left and right directions. The holder (29) is vertically movable between an upper position in contact with an upper surface of the thick-type tape cartridge (40B) so as to press and hold the tape cartridge (40B) as shown in FIG. 1(a) and FIG. 8 and a lower position in contact with an upper surface of the thin-type tape cartridge (40A) so as to press and hold the tape cartridge (40A) as shown in FIG. 1(b) and is normally positioned at the upper position.

The side wall (31) of the loading frame (28) is provided with a pair of upper and lower sensors (34, 35) for identifying the thin-type and the thick-type tape cartridges (40A, 40B). An effective point of the lower sensor (35) is located below a reference height which is defined by the upper surface of the thin-type tape cartridge (40A), and an effective point of the upper sensor (34) is located above the reference height. When only the lower sensor (35) is turned ON by the tape cartridges (40A, 40B) loaded through the loading mouth (27), the holder (29) is displaced from the upper position as shown in FIG. 1(a) to the lower position as shown in FIG. 1(b) so as to press and hold the thin-type tape cartridge (40A) for making it vertically immovable.

As shown in FIG. 2 and FIG. 3, the tape cartridge (40A, 40B) has a tape loading pocket (5) disposed in a front portion of a main body case (1) so as to be opened and closed by a shutter (8) which is slidable in the fore and rear directions along the case lower surface and a front lid (7) which is supported so as to be swingable by the main body case (1). In addition thereto, in the tape drive according to this invention, as shown in FIG. 7(a) and FIG. 9(a), a stroke distance of a pin (36) for opening the front lid (7) by pushing up the front lid (7) is controlled long or short in accordance with the loaded tape cartridges (40A, 40B) based on output signals corresponding to sizes of the tape cartridges detected by the sensors (34, 35).

In each tape cartridge (40A, 40B), as shown in FIG. 2 and FIG. 5, an entrance (16) and an exit (17) for a tape end detection light are opened in the side wall (15) respectively. In addition thereto, the tape drive of the present invention has a tape end detection section (24) provided with a light emitting element (22) for radiating a detection light and a light receiving element (23) for receiving the detection light corresponding to the entrance (16) and the exit 17 respectively. As shown in FIG. 7 and FIG. 9, the tape end detection section (24) is constructed so as to be displaced to a suitable height for the loaded tape cartridge (40A, 40B) based on the output signals corresponding to the sizes of the tape cartridges detected by the sensors (34, 35).

For accomplishing the third and the fourth objects of the present invention, secondly as shown in FIG. 10 to FIG. 12, in a tape drive (D) which is used for either of a thin-type and a thick-type tape cartridges (4OA, 4OB) having different case thicknesses respectively in common therewith, the tape drive (D) accommodates within it a loading frame (28) for receiving and supporting the tape cartridge (40A, 40B) loaded through a loading mouth (27), a holder (29) for holding the tape cartridge (40A, 40B) by pressing it from above in cooperation with the loading frame (28) and a shelter (55) for changing over an opening height of the loading mouth (27) between a fully opened position and a controlled position. As shown in FIG. 12, the loading frame (28) has projections (32) adapted to engage with grooves (12) formed in bottom surfaces of the tape cartridges (40A, 40B) for judging the upper sides and the lower sides of the tape cartridges (40A, 40B). As shown in FIG. 11, an operation panel (15a) of the tape drive (D) is provided with a selecting switch (56) for selecting the tape cartridge size, so that the an opening height of the loading mouth (27) and a height of the holder (29) can be adjusted so as to match with the tape cartridge (40A, 40B) to be new loaded by vertically actuating the shelter (55) and the holder (29) based on an output signal corresponding to the size of the tape cartridge selected by the selecting switch (56).

Preferably, according to the present invention, a shutter (8) for opening and closing drive shaft insertion holes (10) and the loading pocket (5) from below on the side of the main body case (1) may be provided in a bottom surface of the tape cartridge (40A, 40B). As shown in FIG. 12, guide grooves (12) adapted to be slide guided by lock releasing pieces (32) on the tape drive side are formed in the lower surface of the shutter (8), while the guide grooves (12) serve as the above-mentioned grooves and the lock releasing pieces (32) serve as the above-mentioned projections.

According to the present invention, in the above-mentioned tape drive (D), the shelter (55) may be provided with a sensor (57) for sensing a case thickness of the tape cartridge (40A, 40B).

For accomplishing the fifth object of the present invention, thirdly in a tape drive (D) which is used for either of a thin-type and a thick-type tape cartridges (4OA, 4OB) having different case thicknesses respectively in common therewith, as shown in FIG. 14 to FIG. 17, the tape cartridge loading mouth (27) is opened so as to face the loading frame (28) provided within the tape drive (D), while a first door (43) and a second door (44) are adjacently disposed on the outside and on the inside within the loading mouth (27). The first door (43) and the second door (44) are supported so as to be swingable between shielding positions for shielding the loading mouth (27) and retreat positions to which they are swung inward interlockingly with the loading of the tape cartridge (40A, 40B) respectively while they are urged toward the shielding positions. In addition thereto, as shown in FIG. 16, a vertical space (H1) between the lower edge of the first door (43) and an opening lower edge of the loading mouth (27) is set larger than a vertical thickness of the thin-type tape cartridge (40A) and smaller than a vertical thickness of the thick-type tape cartridge (40B). A vertical space (H2) between the lower edge of the second door (44) and an opening lower edge of the loading mouth (27) is set smaller than a vertical thickness of the thin-type tape cartridge (40A). And thus, based on output signals from a first sensor (45) and a second sensor (46) for sensing the retreat swings of both the doors (43, 44), a size of the tape cartridge (40A, 40B) loaded onto the loading frame (28) can be judged.

Preferably, according to the present invention, both the first sensor (45) and the second sensor (46) in the above-mentioned tape drive may be constructed by switches adapted to be turned ON interlockingly with the retreat swings of both the doors (43, 44), while as shown in FIG. 16, both the doors (43, 44) are provided with actuator cams (43a, 44a) for switching both the sensors (45, 46).

According to the present invention, the above-mentioned tape drive (D) may accommodate within it the holder (29) for holding the tape cartridge (40A, 40B) by pressing it from above in cooperation with the loading frame (28) in cooperation with the loading frame (28), and thus the tape cartridge (40A, 40B) may be fixedly held in a use posture by lowering the holder (29) based on the output signals from both the first and the second sensors (45, 46).

It is preferable that in the tape drive according to the present invention, the opening of the loading mouth (27) is shielded by the second door (44) in a unused state as shown in FIG. 16.

For accomplishing the sixth object of the present invention, fourth as shown in FIG. 18 to FIG. 12, in a tape drive (D) which can be used for either of a thin-type and a thick-type tape cartridges (4OA, 4OB) having different case thicknesses respectively in common therewith, the thin-type and the thick-type record cartridges (40A, 40B) comprises a tape loading pocket (5) arranged in a middle portion of a main body case (1) on its front face side so that its lower surface and its front surface can be opened, a shutter (8) slidable in the fore and rear directions along an outer lower surface of the main body case (1) for opening and closing the lower surface of the pocket (5), and a front lid (7) supported so as to be swingable by the main body case (1) for opening and closing the front surface of the pocket (5). As shown in FIG. 21, the front lid (7) comprises a front face plate (62) for covering the front opening of the pocket (5) between its left and right ends and connection pieces (63) integrally connected to the front face plate (62) so as to extend rearward in the case from left and right ends thereof. The front lid (7) is pivotally supported so as to be opened upward about supporting shafts (7a) projected inward oppositely to each other from the inside surfaces of the connection pieces between a closed posture for closing the pocket (5) and an opened posture for opening the front surface of the pocket (5) by its raising position above the upper surface of the pocket (5). As shown in FIG. 22, the front face plate (62) of the thick-type tape cartridge (40B) comprises a main face wall (66) laterally elongated in the left and right directions so as to form most of the front face plate (62) and assistant side face walls (67) pivotally connected to the main face wall (66) through connection shafts (68) projected oppositely to each other from the inside surfaces of the connection pieces (63). The assistant side face walls (67) are pivotally supported about the connection shafts (68) between an aligned posture in which they are aligned in a coplanar state with an outer surface of the main face wall (66) as shown in FIG. 22 and a bent posture in which they are bent downward substantially perpendicularly to the main face wall (66) as shown in FIG. 18(b) while they are resiliently urged toward the bent posture by coil springs (69) mounted to the connection shafts (68). As shown in FIG. 22, when the front lid (7) takes the closed posture as shown in FIG. 22, the assistant side face walls (67) takes the aligned posture in which their outer surfaces are aligned in the coplanar state with the outer surface of the main face wall (66) as well as when front lid (7) pivots from the closed posture to the opened posture, the assistant side face walls (67) shift to the bent posture as shown in FIG. 18(b).

Preferably, according to the present invention, vertical width dimensions of the main wall (66) and the assistant wall (67) are set so that a projecting distance (Wb) of the pivoting front lid (7) of the thick-type tape cartridge (40B) defined by a circular movement trace scribed by the main wall (66) pivoting about the supporting shafts (7a) with the opening and closing of the front lid (7) as shown in FIG. 18(b) and an outer surface of the front face plate (67) in the closed posture takes approximately the same value with respect to a projecting distance (Wa) defined by a movement trace scribed by the pivoting front lid (7) of the thin-type tape cartridge (40A) as shown in FIG. 18(a) and an outer surface of the front face plate (67) in the closed posture, According to the present invention, the above-mentioned tape drive (D) may accommodate within it the holder (29) for holding the tape cartridge (40A, 40B) by pressing it from above in cooperation with the loading frame (28) in cooperation with the loading frame (28), and thus the tape cartridge (40A, 40B) may be fixedly held in a use posture by lowering the holder (29) based on the output signals from both the first and the second sensors (45, 46).

For accomplishing the sixth object of the present invention, preferably in a tape drive which can be used for either of a thin-type and a thick-type tape cartridges (4OA, 4OB) having different vertical thicknesses respectively in common therewith, the thin-type and the thick-type tape cartridges (40A, 40B) comprises the tape loading pocket (5) arranged in a middle portion of the main body case (1) on its front face side so that its lower surface and its front surface can be opened, a shutter (8) slidable in the fore and rear directions along the outer lower surface of the main body case (1) for opening and closing the lower surface of the pocket (5), and the front lid (7) supported so as to be swingable by the main body case (1) for opening and closing the front surface of the pocket (5). As shown in FIG. 21, the front lid (7) comprises the front face plate (62) for covering the front opening of the pocket (5) between its left and right ends and the connection pieces (63) integrally connected to the front face plate (62) so as to extend rearward in the case from left and right ends thereof so as to be pivotally supported so as to be opened upward about supporting shafts (7a) projected inward oppositely to each other from the inside surfaces of the connection pieces (63) between a closed posture for closing the pocket (5) and an opened posture for opening the front surface of the pocket (5) by its raising position above the upper surface of the pocket (5). In addition thereto, an arrangement position of the supporting shafts (7a) of the thick-type tape cartridge (40B) is adjusted so that projecting distances (Wb, Wc) of the pivoting front lid (7) of the thick-type tape cartridge (40B) defined by a circular movement trace scribed by the front lid (7) pivoting about the supporting shafts (7a) as shown in FIG. 23(b),(c) and an outer surface of the front lid (7) in the closed posture take approximately the same value with respect to a projecting distance (Wd) defined by a movement trace scribed by the pivoting front lid (7) of the thin-type tape cartridge (40A) as shown in FIG. 23(a) and an outer surface of the front lid (7) in the closed posture.

Further preferably, according to the present invention, the arrangement position of the supporting shafts (7a) of the thick-type tape cartridge (40B) defined by a distance (D8) between the outer surface of the front lid (7) in the closed posture and the supporting shaft (7a) in the fore and rear direction and a distance (D4) between the lower surface of the main body case (1) and the supporting shaft (7a) in the vertical direction as shown in FIG. 23(b) is the same as the arrangement position of the supporting shafts (7a) of the thin-type tape cartridge (40A) defined by a distance (D7) between the outer surface of the front lid (7) in the closed posture and the supporting shaft (7a) in the fore and rear direction and a distance (D3) between the lower surface of the main body case (1) and the supporting shaft (7a) in the vertical direction as shown in FIG. 23(a), and thus the setting is made so that the movement traces scribed by the front lids (7) about the supporting shafts (7a) of these thin-type and the thick-type tape cartridges (40A, 40B) become the same as each other.

According to the present invention, as shown in FIG. 23(b), (c) and FIG. 24, a relief recessed portion (73) for allowing an opening movement of the front lid (7) may be formed in an included angle portion between the upper end surface (71) and the front end surface (72) of the thick-type tape cartridge (40B) like a stepped notch.

For accomplishing the seventh object of the present invention, in the tape drive of the fourth invention, as shown in FIG. 20, a main body case (1) is formed by a lower case (1b) and an upper case (1a) connected to each other like a socket-spigot lid engagement. In the thin-type and the thick-type tape cartridges (4OA, 4OB), the lower case (1b) has the same thickness dimension in both the cartridges so as to be used in common, while the upper cases (1a) have different thickness dimensions in the thin type and the thick-type tape cartridges (40A, 40B) respectively.

Advantages of the Invention

First according to the present invention, as shown in FIG. 1, the tape drive (D) accommodates within it the loading frame (28) for receiving and supporting the tape cartridge (40A, 40B) and the holder (29) for pressing and holding the tape cartridge (40A, 40B) in cooperation with the loading frame (28). Further, the sensors (34, 35) for detecting the size of the tape cartridge are arranged in the side wall (31) of the loading frame (28), and thus the holder (29) can be displaced to a height matching with the tape cartridge (40A, 40B) loaded onto the holder 29 based on the tape cartridge side detected by those sensors (34, 35).

Therefore, according to the tape drive (D) of the present invention, it becomes unnecessary to provide the dedicated tape drive (D) for each tape cartridge (40A, 40B) having different case thicknesses, each tape cartridge (40A, 40B) is applicable to one tape drive (D) in common as well as also a carrier mechanism for conveying each tape cartridge (40A, 40B) becomes unnecessary.

In a condition that the holder (29) is raised in the upper position corresponding to the thick-type tape cartridge (40B) having the thick case, though it is possible to load the thin-type tape cartridge (40A) having the thin case, when a drive mechanism or a signal recording and reading out mechanism is operated as it is, the tape drive (D) falls into breakdown because the thin-type tape cartridge (40A) is not pressed and held by the holder (29). As far as this point is concerned, according to the present invention, since the sensors (34, 35) are arranged in the side wall (31) of the loading frame (28) so that the case thickness of the tape cartridge (40A, 40B) loaded into the tape drive (D) can be detected by these sensors to adjust the height position of the holder (29) so as to match with the loaded tape cartridge (40A, 40B), it is possible to surely prevent the vertical swinging of the tape cartridge (40A, 40B) having every dimension so as to enable the correct recording and reading out of information signals.

Further, the holder (29) according to the present invention is positioned in a raised position in the normal condition as shown in FIG. 8 from which it is brought into contact with the upper surface of the thick-type tape cartridge (40B) so as to press and hold the cartridge, and it is further moved to the lower position as shown in FIG. 7 only when the loaded cartridge is judged to be the thin-type tape cartridge (40A) by the sensor (35). That is, the holder (29) is adapted to move to two-stepped upper and lower levels. The holder 29 is a high position above the upper surface of the thick-type tape cartridge (40B) in the normal condition, and thus in comparison with such an arrangement that the holder (29) is moved to each height position of the tape cartridge (40A, 40B) detected by the sensor (34, 35), a driving mechanism for the holder (29) can be further simplified and the tape drive (D) can be compactified.

Further, according to the present invention, a pair of upper and lower sensors (34, 35) for identifying the thin-type and the thick-type tape cartridges (40A, 40B) are arranged in the side wall (31) of the load frame (28), while an effective point of the lower sensor (35) is located below a reference level which is defined by the upper surface of the thin-type tape cartridge (40A) as shown in FIG. 1 and an effective point of the upper sensor (34) is located above the reference level. Therefore, it is possible to surely detect the size of the loaded tape cartridge by such a simple arrangement.

Further, in the tape drive (D) according to the present invention, as shown in FIG. 7, when a stroke distance of a pin (36) for pushing up and opening the front lid (7) is made adjustable for matching with the tape cartridge (40A, 40B) detected by the sensor (34, 35), the pin (36) can be used for the large and the small tape cartridges (40A, 40B) in common therewith.

According to the present invention, when a tape end detection portion 24 on the side of the tape drive (D) as shown in FIG. 7 is used for both the large and the small tape cartridges (40A, 40B) in common, it becomes possible to simplify an arrangement for detecting the tape end within the tape drive (D), to reduce a total cost of the tape drive owing to that simplification and also to attain the compactification thereof.

Secondly, according to the present invention, as shown in FIG. 10 to FIG. 12, the tape drive (D) accommodates within it a loading frame (28) for receiving and supporting the tape cartridge (40A, 40B) having a case with different thicknesses, a holder (29) for holding the tape cartridge (40A, 40B) by pressing it from above in cooperation with the loading frame (28) and a shelter (55) for changing over an opening height of the loading mouth (27) between a fully opened position and a controlled position. The loading frame (28) has projections (32) adapted to engage with grooves (12) formed in bottom surfaces of the tape cartridges (40A, 40B) for judging the upper sides and the lower sides of the tape cartridges (40A, 40B). As shown in FIG. 11, an operation panel (15a) of the tape drive (D) is provided with a selecting switch (56) for selecting the tape cartridge size, so that the an opening height of the loading mouth (27) and a height of the holder (29) can be adjusted so as to match with the tape cartridge (40A, 40B) to be new loaded by vertically actuating the shelter (55) and the holder (29) based on an output signal corresponding to the size of the tape cartridge selected by the selecting switch (56).

Therefore, according to the tape drive (D) of the present invention, it becomes unnecessary to provide the dedicated tape drive (D) for every tape cartridge (40A, 40B) being different in case thickness, it is possible to apply one tape drive (D) to the respective tape cartridges (40A, 40B) in common therewith, and also a carrier mechanism for conveying the respective tape cartridges (40A, 40B) becomes unnecessary.

According to the present invention, since an opening height of the mounting mouth (27) and a height of the holder (29) are adjusted to a height matching with the tape cartridge (40A, 40B) to be new loaded by previously selecting a size of the tape cartridge (40A, 40B) to be loaded from now by the selecting switch (56) so as to vertically operate the shelter (55) and the holder (29), it is possible to surely prevent the erroneous loading of the tape cartridge (40A, 40B). Additionally, by surely preventing the erroneous loading of the upside-down tape cartridge (40A, 40B), it becomes possible to sweep away heavy accidents such as a trouble of the tape drive (D), a breakage of the tape cartridge and so on accompanied with the erroneous loading.

Further, according to the present invention, as shown in FIG. 10, since the lock releasing pieces (32) on the side of the tape drive (D) serve also as the projections for judging the upside and the downside of the tape cartridge (40A, 40B), there are no useless portions in the arrangement and thus an interior construction of the tape drive (D) can be simplified by that to improve its reliability.

As for the present invention, the thin-type tape cartridge (40A) may be loaded under such a condition that the shelter (55) and the loading mouth (27) are kept in a fully opened position corresponding to the thick-type tape cartridge (40B). But, when the driving mechanism and the signal recording and reading out mechanism are driven under that condition, the tape drive (D) falls into an out-of-order because the thin-type tape cartridge (40A) is not pressed by the holder (29). As for that matter, as shown in FIG. 10 and FIG. 12, since the tape drive (D) can be operated only under such a condition that the tape cartridge (40A, 40B) having a suitable size has been loaded thereto by judging whether the case thickness of the now loaded tape cartridge is coincident with the tape cartridge selected by the selecting switch (56) or not, with a sensor (57) disposed at a lower portion of the inside surface of the shelter (55), it is possible to prevent the tape drive (D) from falling to a trouble even when the erroneous loading would have been made by mistake and thus to correctly record and read out information signals for the respective tape cartridges (40A, 40B).

Third, in the tape drive according to the present invention, as shown in FIG. 14 to FIG. 17, the loading mouth (27) for the tape cartridge can be shielded by the first door (43) and the second door (44) so that the vertical spaces (H1)(H2) between the respective doors (43, 44) and an opening lower edge of the loading mouth (27) become different, namely large and small with reference to the case thicknesses of the tape cartridges (40A, 40B). Thereby, when loading each tape cartridge (40A, 40B), one of the doors (43, 44) or both of them can swing for retreating. In addition thereto, the retreat swings of both the doors (43, 44) are sensed by the first sensor (45) and the second sensor (46), and thus the size of the tape cartridge (40A, 40B) loaded onto the loading frame (28) can be automatically judged based on the output signal from each sensor (45, 46).

Therefore, according to the tape drive of the present invention, by automatically judging the case thickness the tape cartridge (40A, 40B) loaded onto the loading frame (28), for example the pressing height of the holder (29) can be made to match with the respective tape cartridges (40A, 40B) or the like, resulting in that the condition of the tape drive (D) can be made to match with the tape cartridges (40A, 40B).

According to the present invention, as shown in FIG. 16, when both the first and the second sensor (45, 46) are constructed by switches and both the first and the second doors (43, 44) swing for retreating, the respective sensor (45, 46) are turned ON by the actuator cams (43a), (44a) provided in both the doors (43, 44) respectively. Therefore, when it is made possible to directly actuate both the sensors (45, 46) by the actuator cams (43a), (44a) so as to switch them to the ON state and the OFF state, it becomes possible to surely judge the case thickness by both the sensors (45, 46) without being affected by surrounding physical circumstances.

Further, according to the present invention, the tape cartridge (40A, 40B) can be fixedly held in the use posture also by the loading frame (28) and the holder (29) by lowering the holder (29) based on the output signals from both the first and the second sensors (45, 46). In this case, since the lowering positions of the holder (29) are automatically changed for the respective tape cartridges (40A, 40B) having different case thicknesses so as to securely hold each tape cartridge (40A, 40B) in its suitable use posture, it becomes possible to omit such a labor as, for example inputting the type of the tape cartridge to be loaded before the loading of the tape cartridge (40A, 40B) through the loading mouth (27).

According to the present invention, as shown in FIG. 16, when the opening of the loading mouth (27) is shielded by the second door (44) in the unused state, it is possible to prevent the entering of dust and/or foreign material into the case (26) through the loading mouth (27).

As for the present invention, it can be intended that an arrangement position of the supporting shaft (7a) of the thick-type tape cartridge (40B) may be made identical with that of the thin-type tape cartridge (40A) in such a compatible type tape cartridges (40A, 40B). That is, as shown in FIG. 18, it can be intended that the arrangement position of the supporting shaft (7a) defined by a vertical distance (D1) between the upper end surface of the main body case (1) and the supporting shaft (7a) and a fore and rear distance (D2) between the front face plate (62) of the front lid (7) in the closed posture and the supporting shaft (7a) may be made identical with each other in both the thin-type and the thick-type tape cartridges (40A, 40B). In this case, however, in the thick-type tape cartridge (40B) as shown in FIG. 18(c), a projecting distance (Wc) of the pivoting front lid (7) restricted by a circular trace scribed by the front face plate (62) pivoting about the supporting shaft (7a) accompanying with the opening and closing of the front lid (7) and an outer surface of the front face plate (62) in the closed posture can't help becoming extremely large in comparison with a projecting distance (Wa) of the pivoting front lid (7) of the thin-type tape cartridge (40A) shown in FIG. 18(a).

As concerns with this matter, fourth according to the present invention, by constructing the front face plate (62) of the front lid (7) of the thick-type tape cartridge (40B) as a two-main component structure comprising a main face wall (66) and an assistant face wall (67) pivotally connected to the main face wall (66) as shown in FIG. 18(b) and FIG. 22, a projecting distance (Wb) of the pivoting front lid (7) restricted by a circular trace scribed by the main face wall (66) pivoting about the supporting shaft (7a) accompanying with the opening and closing of the front lid (7) and an outer surface of the front face plate (62) in the closed posture can be made to approximate to the projecting distance (Wa) of the pivoting front lid (7) of the thin-type tape cartridge (40A) as soon as possible as shown in FIGS. 18(a), (b).

According to the present invention, when previously setting the vertical dimensions of the main face wall (66) and the assistant face wall (67) (the vertical dimensions of the main face wall (66) and the assistant face wall (67) in the closed posture) so that the projecting distance (Wb) of the pivoting front lid (7) of the thick-type tape cartridge (40B) as shown in FIG. 18(b) becomes approximately the same as the projecting distance (Wa) of the pivoting front lid (7) of the thin-type tape cartridge (40A), an any case, the projecting distance at the time of pivoting can be made smaller in comparison with that of the front lid (7) having one sheet of front face plate (62) as shown in FIG. 18(c).

Further, as for the present invention, when deciding the arrangement position of the supporting shaft (7a) of the thick-type tape cartridge (40B), for example as shown in FIG. 23(d), it may be thought up to make a distance (D6') from the upper end surface (71) of the upper case (1a) to the supporting shaft (7a) identical with a distance (D3') from the upper end surface (71) of the upper case (1a) in the thin-type tape cartridge (40A) to the supporting shaft (7a). Also in this case, however, as shown in FIG. 23(d), a projecting distance (Wg) of the pivoting front lid (7) in the thick-type tape cartridge (40B) can't help becoming extremely large in comparison with a projecting distance (Wd) of the pivoting front lid (7) in the thin-type tape cartridge (40A) shown in FIG. 23(a).

As concerns with this matter, fifthly according to the present invention, by adjusting the arrangement position of the supporting shaft (7a) relative to the side wall of the main body case (1), the projecting distance (We, Wf) of the pivoting front lid (7) of the thick-type tape cartridge (40B) as shown in FIGS. 23(b), (c) becomes approximately the same as the projecting distance (Wd) of the pivoting front lid (7) of the thin-type tape cartridge (40A). Also in this case, since the projecting distance (We, Wf) of the pivoting front lid (7) can be made small by making it approximate to the projecting distance (Wd) of the pivoting front lid (7) of the thin-type tape cartridge (40A) as soon as possible, it is possible to approximate the stand-by positions of the reading out head and the recording head to the side of tape drive (D).

Especially, in this case, according to the present invention, as shown in FIG. 23(b), when an arrangement position of the supporting shaft (7a) of the thick-type tape cartridge (40B) restricted by the fore and rear distance (D8) between the outer surface of the front lid (7) in the closed posture and the supporting shaft (7a) and the vertical distance (D4) between the lower surface of the main body case (1) and the supporting shaft (7a) is set to the same arrangement position of the supporting shaft (7a) of the thin-type tape cartridge (40A) restricted by the corresponding distances (D7, D3) as shown in FIG. 23(a), it is possible to make the movement traces of the front lids (7) of the thin-type and the thick-type tape cartridges (40A, 40B) completely identical with each other.

Incidentally, in an arrangement shown in FIG. 23(c), a vertical distance (D5) between the lower surface of the main body case (1) and the supporting shaft (7a) and a fore and rear distance (D9) between the leading end outer surface of the front lid (7) in the closed posture and the supporting shaft (7a) are set to middle values between the corresponding distances (D3, D7) in the thin-type tape cartridge (40A) shown in FIG. 23(a) and the corresponding distances (D6, D10) in the thick-type tape cartridge (40B) shown in FIG. 23(d) respectively. Even though such an arrangement is employed, the projecting distance (Wf) of the pivoting front lid (7) of the thick-type tape cartridge (40B) can be made smaller than that of the arrangement shown in FIG. 23(d).

According to the present invention, as shown in FIGS. 23(b), (c) and FIG. 24, when a releasing recessed portion (73) for allowing the open-pivoting movement of the front lid (7) is formed like a stepped notch in an included angle portion between the upper end surface (71) of the thick-type tape (40A) and the front end surface (72), the front face plate (62) can be prevented from being brought into contact with the upper end surface (71) of the main body case (1) in the opened posture so as to allow the open-pivoting of the front lid (7) smoothly. In comparison with the arrangement shown in FIG. 24(d), the front face plate (62) can be set to the opened state with a less bulky manner relative to the main body case (1).

Preferably, according to the present invention, as shown in FIG. 20, in the thin-type and the thick-type tape cartridges (40A, 40B), when their respective lower cases (1b) are used as a common component part for them, the number of component parts can be further reduced in comparison with the respective tape cartridges (40A, 40B) having different lower cases (1b).

BRIEF DESCRIPTION OF DRAWINGS

The above and other objectives and features of the present invention will become more apparent from the following description of preferred embodiments thereof with reference to the accompanying drawings throughout which like parts are designated by like reference numerals, and wherein.

LIST OF COMPONENT PARTS

Figure 1:
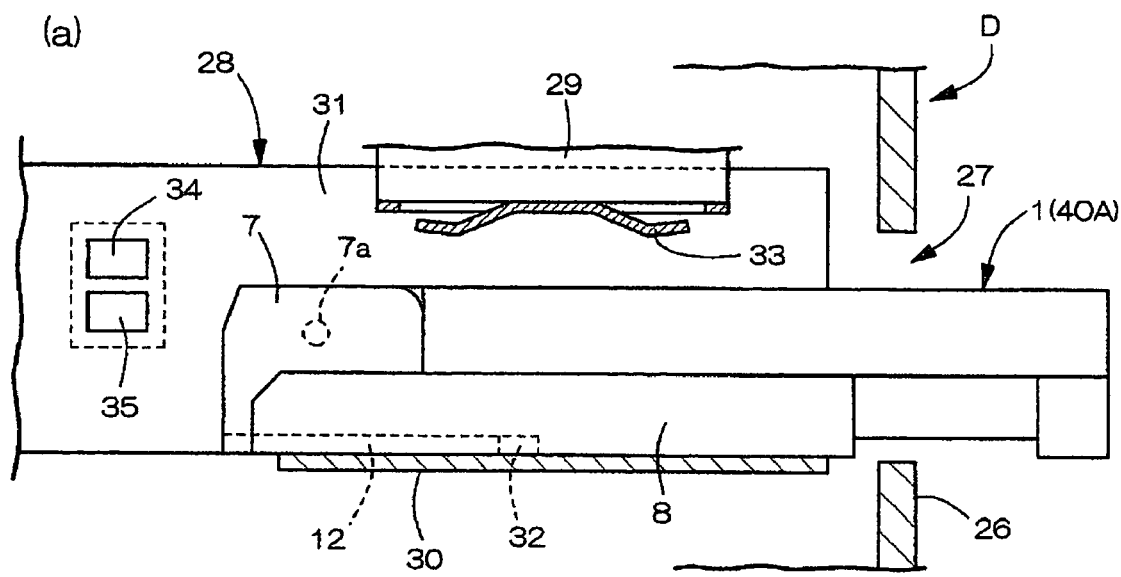
FIG. 1 is a vertical sectional side view showing a tape drive according to a first embodiment of the present invention to which a thin-type tape cartridge is loaded.
Figure 1:
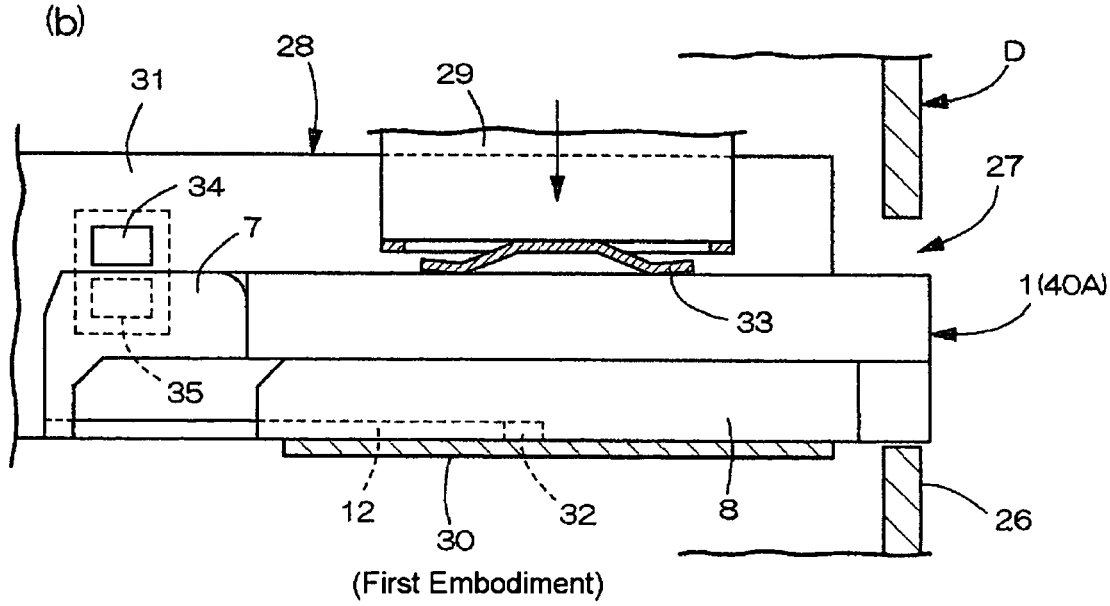

1 Main body case
5 Loading pocket
7 Front lid
8 Shutter
16 Entrance for tape end detection light
17 Exit for tape end detection light
22 Light emitting element
23 Light receiving element
24 Tape end detecting section
27 Loading mouth
28 Loading frame
29 Holder
30 Bottom wall of loading frame
31 Side wall of loading frame
34 Sensor (Upper)
35 Sensor (Lower)
36 Pin
40A Thin-type tape cartridge
40B Thick-type tape cartridge
43 First door
44 Second door
45 First sensor
46 Second sensor
55 Shelter
56 Selecting switch
62 Front face plate of front lid
63 Connection piece
66 Main face wall of front face plate
67 Assistant side face wall of front face plate
68 Connection shaft
69 Spring
71 Upper end surface of main body case
72 Front end surface of main body case
73 Relief recessed portion
H1 Vertical space between first door and loading mouth
H2 Vertical space between second door and loading mouth
D Tape drive

BEST MODE FOR CARRYING OUT THE INVENTION

First Embodiment

FIG. 1 to FIG. 9 show a first embodiment of a tape drive D of the present invention according to claims 1 to 3 and a tape cartridge for use in this tape drive D. As the tape cartridge, there are two kinds of tape cartridges, namely a thin-type tape cartridge 40A as shown in FIG. 1 and a thick-type tape cartridge 40B having a tape with its width twice as wide as that of the thin-type tape cartridge 40A. The tape drive D has one loading mouth through which these tape cartridges 40A, 40B can be loaded therein so as to be able to read out and record information signals from and into each tape cartridge 40A, 40B. A nominal width of the tape of the thin-type tape cartridge 40A is 4 mm.

Figure 2:
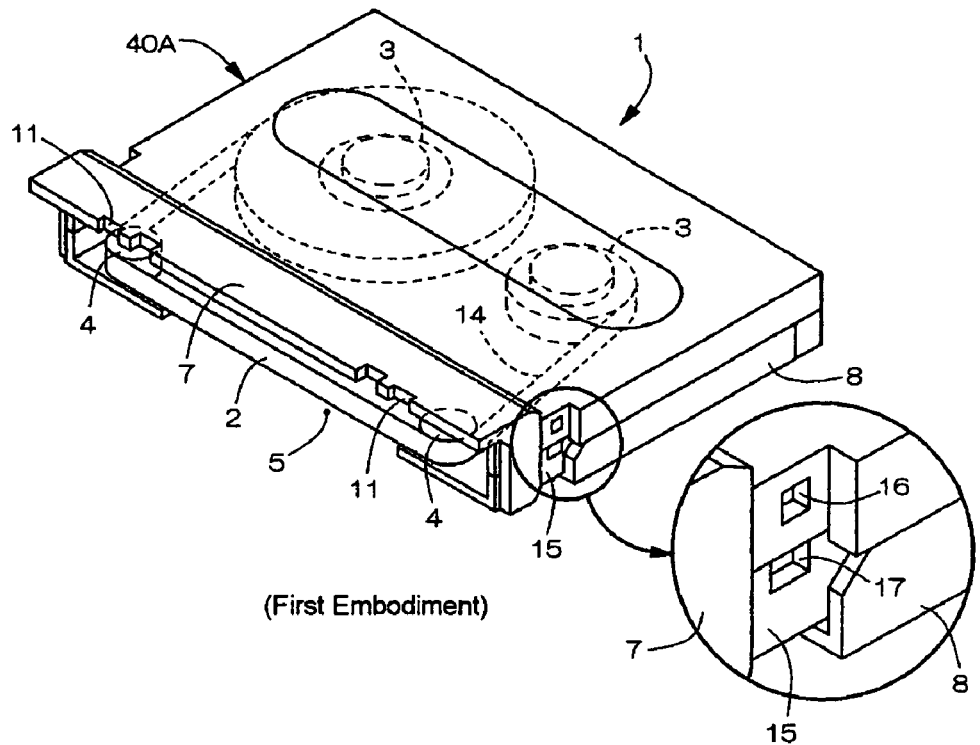
FIG. 2 is a perspective view of the thin-type tape cartridge of the first embodiment in view from above.
Figure 3:
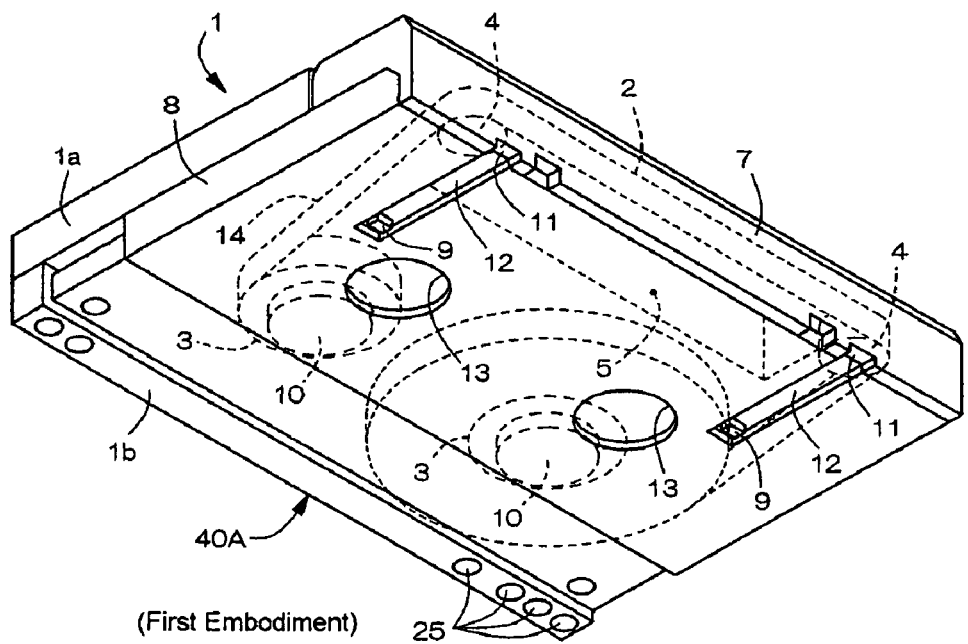
FIG. 3 is a perspective view of the thin-type tape cartridge of the first embodiment in view from below.
Figure 4:
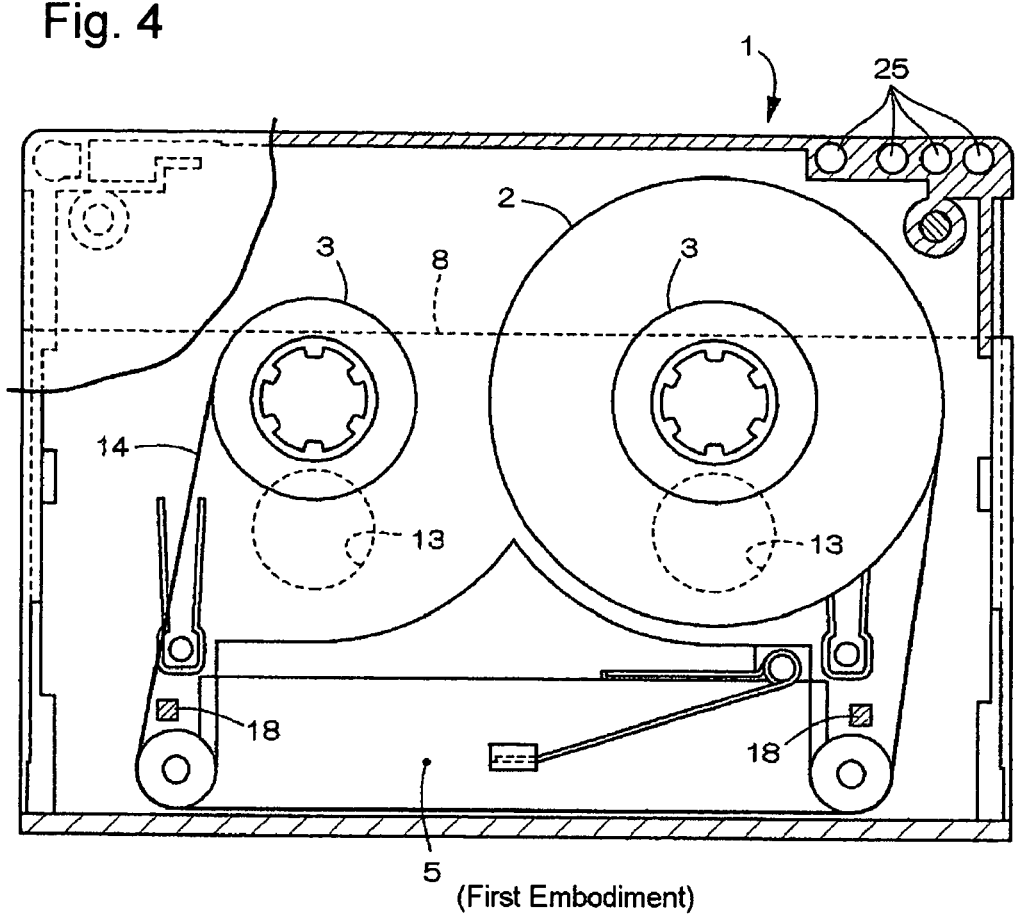
FIG. 4 is a plan view of an interior of the thin-type tape cartridge of the first embodiment.

In FIG. 2 and FIG. 3, since the thin-type tape cartridge (40A) has the same structure as that of a music dedicated DAT for recording digital audio signals which is an article on the market and differs only in having a proper recording format and a proper recording and reading out speed for the information signals, only its schematic construction will be explained. The thin-type tape cartridge 40A comprises hubs 3, 3 disposed at a left and a right locations within a thin square box-like main body case 1 for winding up a tape (a magnetic tape) 2 so that the tape 2 let out of one hub 3 can be guided so as to move to the other hub 3 through a pair of left and right tape guides 4, 4. By arranging the tape guides 4, 4 at the left and right portions in front of a loading pocket 5 formed in a front surface of the case.

Figure 7:
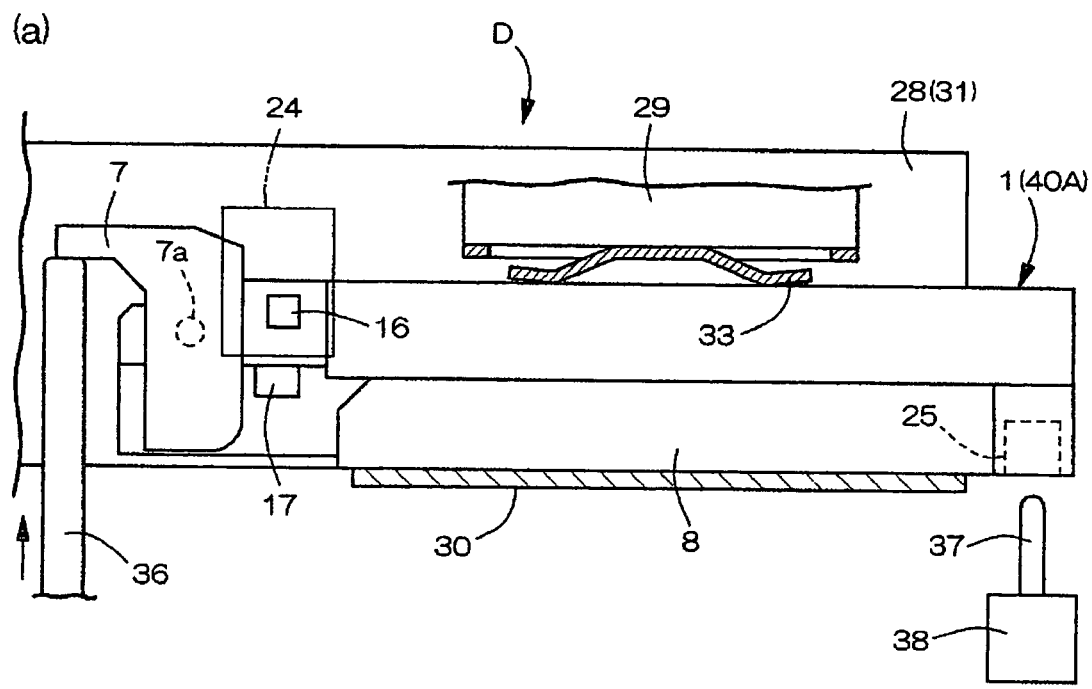
FIG. 7 is a vertical sectional side view showing the tape drive according to the first embodiment to which the thin-type tape cartridge is loaded.
Figure 7:
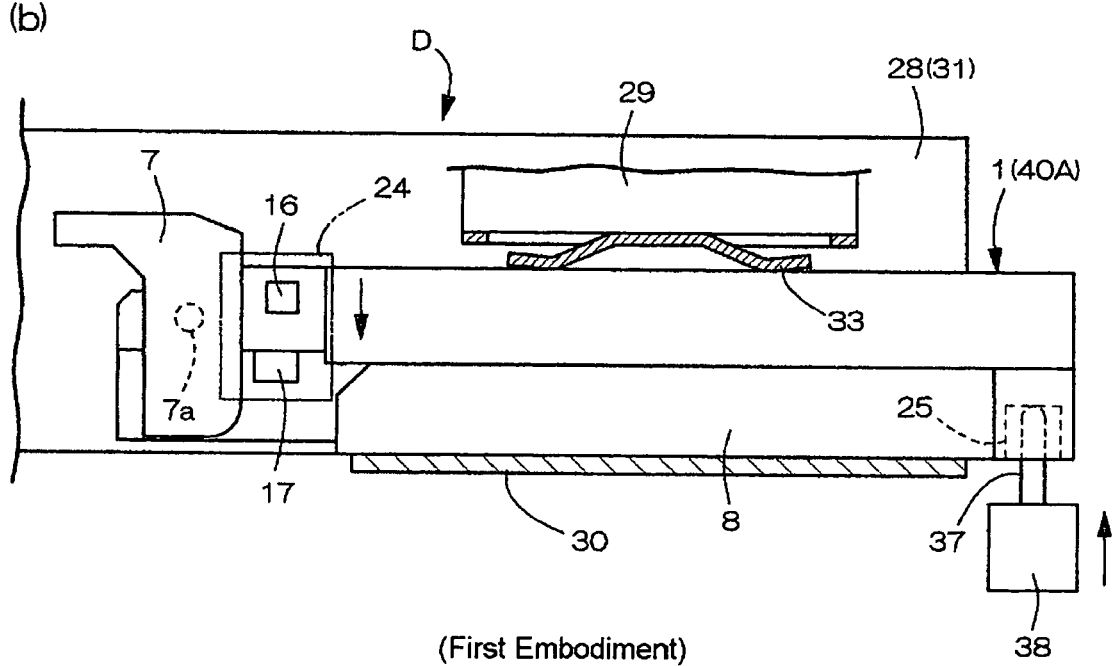
Figure 8:
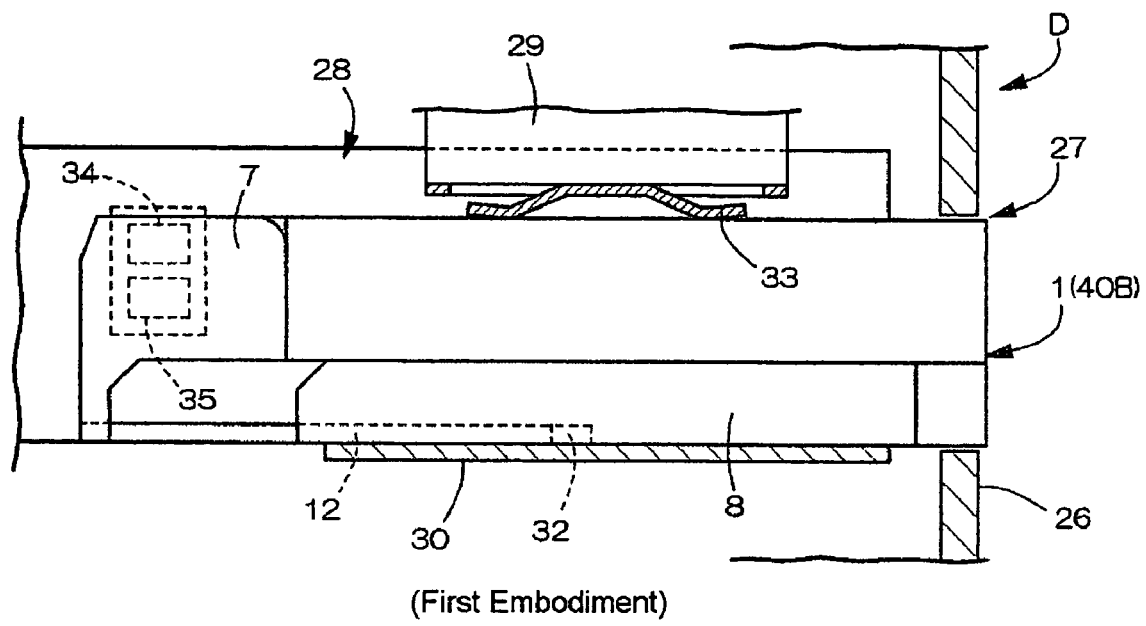
FIG. 8 is a vertical sectional side view showing the tape drive according to the first embodiment to which the thick-type tape cartridge is loaded.
Figure 9:
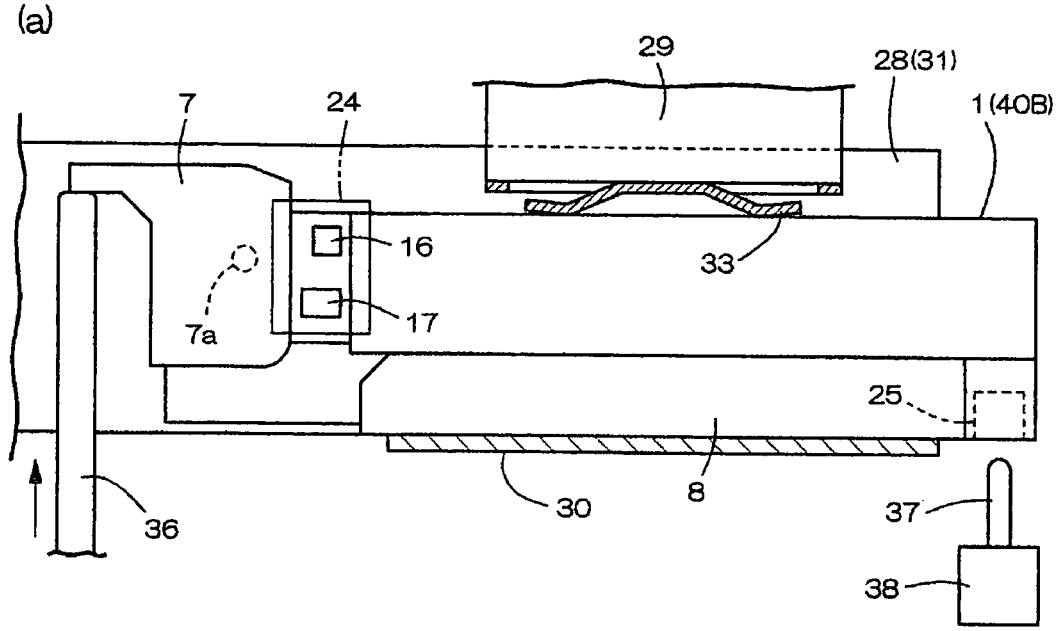
FIG. 9 is a vertical sectional side view showing the tape drive according to the first embodiment to which the thick-type tape cartridge is loaded.
Figure 9:
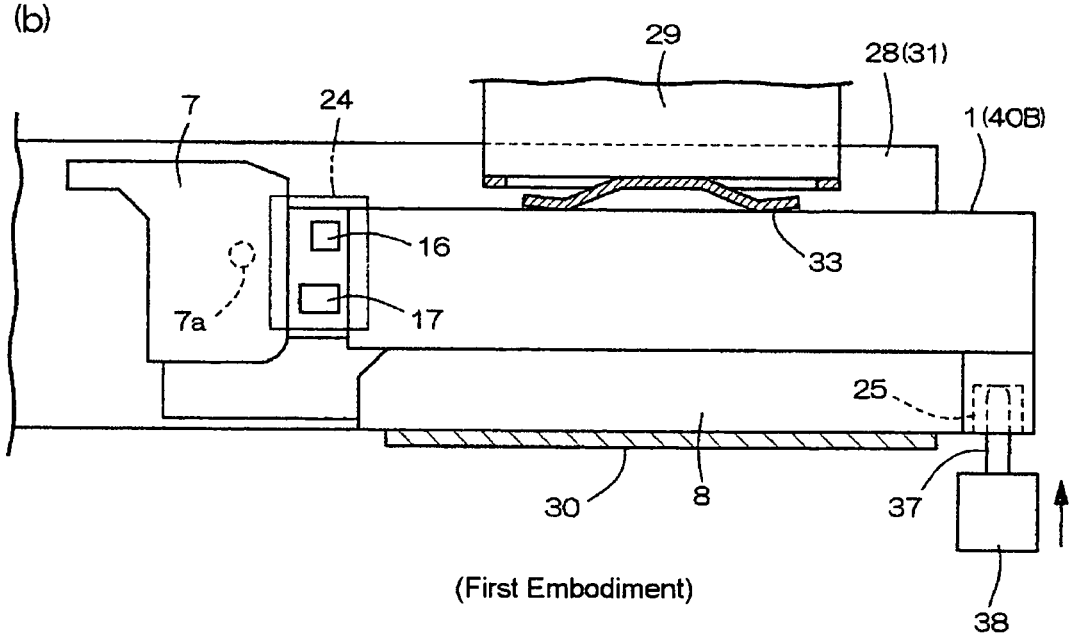

In order to protect the tape 2 for an unused time, the front face and the upper surface of the loading pocket 5 are covered by a front lid 7 as well as the under surface of the loading pocket 5 is covered by a shutter 8. The front lid 7 is supported so as to be swingable by the main body case 1 so as to be openable upward and can be opened and closed only after the shutter 8 has been opened. In a normal state, it is resiliently urged so as to be closed by a spring (not illustrated) and supported by the shutter 8 so as to be unable to be opened. The front lid 7 is pivotally openable and closable about left and right supporting shafts 7a between a closed position in which it closes the front face of the loading pocket 5 as shown in FIG. 1 and FIG. 8 and an upward opened position as shown in FIG. 7 and FIG. 9 as well as can be pushed up to the opened position by a pin 36 disposed on the side of the tape drive D. By using this opening operation of the front lid 7, a hub lock arranged within the main body case 1 is released so as to allow the rotating of the hubs 3, 3.

A stroke distance of the pin 36 for opening the front lid 7 is adapted to be changed in two steps, namely to a long and a short distances so as to match with the respective tape cartridges 40A, 40B. That is, in the case of the thin-type tape cartridge 40A, the setting of the short stroke distance is selected corresponding to the projecting distance of the pivoting front lid 7 as shown in FIG. 7(a), and in the case of the thick-type tape cartridge 40B, the setting of the long stroke distance is selected as shown in FIG. 9(a).

In FIG. 3, the shutter 8 is arranged in an outside lower surface of the main body case 1 so as to be slidably supported by the main body case 1 in the fore and rear directions. In the unused state, the shutter 8 is locked by locking claws 9 disposed in the main body case 1 so as to be unopenable. The shutter 8 in the unused state covers a lower surface side of the loading pocket 5 as well as covers drive-shaft insertion holes 10 opened in the lower surface of the main body case 1.

When the shutter 8 is opened rearward after the releasing of the locking claws 9, the loading pocket 5 and the drive-shaft insertion holes 10 can be opened. For such an opening operation, notches 11 are formed in the left and the right portions of the front wall lower end of the front lid 7 and further guide grooves 12 for the lock releasing are formed in the bottom wall of the shutter 8 so as to be continuous to the notches 11. The loading claws 9 engage with engagement holes formed in the rear end portions of the guide grooves 12 so as to project into the guide grooves 12. The symbol 13 designates openings for opening the drive-shaft insertion holes 10.

A starting end portion and an ending end portion of the tape 2 are connected to the hubs 3, 3 through transparent leader tapes 14 respectively as shown in FIG. 2 and FIG. 3. For detecting the tape ends by using these transparent leader tapes 14, tape end detecting arrangements are disposed in tape running paths defined between the tape guides 4 and the left and the right hubs 3, 3 so as to be located in opposed sides with respect to each tape running path.

As shown in FIG. 2, the tape end detecting arrangement has an upper detection light entrance 16 and a lower detection light exit 17 opened in left and right side walls 15 of the main body case 1 respectively so as to face the tape running paths between the left and the right tape guides 4 and the left and the right hubs 3. Further, a light reversing member 18 having portions opposed to the entrance 16 and the exit 17 respectively is disposed so that the tape running path is arranged between the member 18 and the entrance 16/the exit 17 (refer to FIG. 4). As shown in FIG. 2, the entrance 16 is formed as a square opening in the upper case 1a. The exit 17 is formed as a rectangular notch in the contact surface between the upper case 1a and the lower case 1b.

Figure 5:
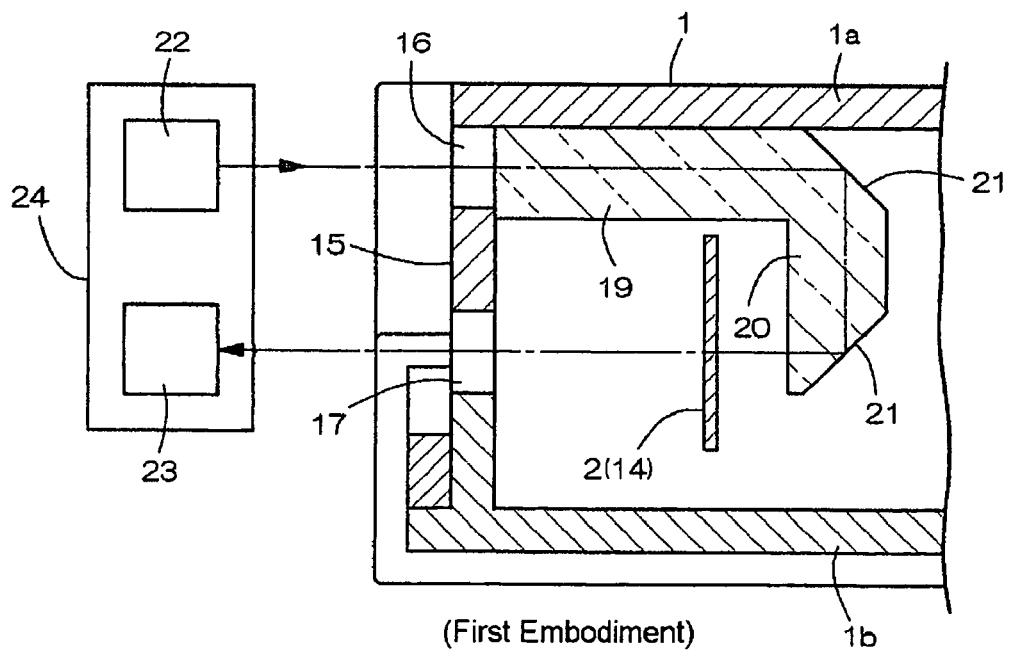
FIG. 5 is a vertical sectional front view of a principal portion showing a tape end detection mechanism in the thin-type tape cartridge of the first embodiment.

The light reversing member 18 is a prism made of a plastic material such as acrylic resin having a high transparency. As shown in FIG. 5, this light reversing member 18 has a horizontal lateral optical path portion 19 connected at its one end to an inside of the entrance 16 and a normal vertical optical path portion 20 connected to the other inside end of the lateral optical path portion 19 so as to project downward. That is, the light reversing member 18 has the lateral optical path portion 19 and the vertical optical path portion 20 integrated as one piece. The vertical optical path portion 20 has reflection surfaces 21 formed at its inside upper and lower portions so as to be inclined at an angle of 45 degrees with respect to the lateral and the vertical optical paths 19, 20 respectively. A center position of the lower reflection surface 21 is coincident with an position adjacent to a center of the vertical width of the tape 2. The light reversing member 18 is fixedly engaged with or bonded to the inner surface of the upper wall of the upper case 1a through its lateral optical path portion 19.

The tape drive D is provided with a detection light emitting element 22 facing the entrance 16 and a detection light receiving element 23 facing the exit 17. These light emitting element 22 and light receiving element 23 are integrated as a tape end detecting unit 24. This tape end detecting unit 24 can be vertically displaced by an actuating mechanism (not illustrated) so as to take suitable levels corresponding to the respective tape cartridges 40A, 40B.

That is, as shown in FIG. 7(b), the tape end detecting unit 24 is displaced to a low position corresponding to the levels of the entrance 16 and the exit 17 for the thin-type tape cartridge 40A, and as shown in FIG. 9(a)(b), it is displaced to a high level to detect the tape end for the thick-type tape cartridge 40B. Incidentally, the tape end detecting unit 24 is normally positioned at the high level as shown in FIG. 9(a)(b) and FIG. 7(a).

As shown in FIG. 5, the detection light irradiated from the light emitting element 22 into the lateral optical path portion 19 through the entrance 16 is reflected downward by the upper reflection surface 21 and then reflected laterally toward the outside of the case by the lower reflection surface 21. Since this laterally reflected detection light passes through the tape running path, only when the leader record 14 exists at that tape running path, the detection light can be detected by the light receiving element 23 through the exit 17. That is, by detecting the detection light by the light receiving element 23, the starting end portion or the ending end portion of the tape 2 within the tape cartridge can be found out, so that the tape feeding, the tape rewinding, the quick feeding or the like can be automatically stopped by the detection signal output from the light receiving element 23.

Identification holes 25 for detecting a tape cartridge proper information such as a type of the tape 2, a length of the tape 2, a size of the tape cartridge, a type of the tape cartridge or the like on the side of the tape drive D are arranged laterally side by side in a left or a right end portion (the right end portion in FIG. 4) of a rear end portion of the lower surface of the lower case 1b. A depth of each identification hole 25 is set in accordance with a type of information corresponding thereto, so that the type of information of the tape cartridge can be obtained by detecting the depths of these identification holes 25 on the side of the tape drive D.

The tape drive (D) is provided with an identification hole detection unit 38 having four identification pins 37 corresponding to the respective identification holes 25. Each pin 37 is constructed so as to be extensible and contractible and the depth of each identification hole 25 can be detected by the contact between the pin 37 and a bottom of the identification hole 25.

As previously explained, since the thick-type tape cartridge 40B shown in FIG. 8 and FIG. 9 has a width dimension of the tape 2 increased twice as wide as that of the thin-type tape cartridge 40A, a thickness of the main body case 1 and a length of the hub 3 thereof are increased by that increased portion. Heights of the front lid 7, a hub lock and so on are also set to the increased dimension similarly. Since other structures of the thick-type tape cartridge 40B are the same as those of the thin-type tape cartridge 40A, the same component members are designated by the same symbols and thus their explanations are omitted.

Figure 6:
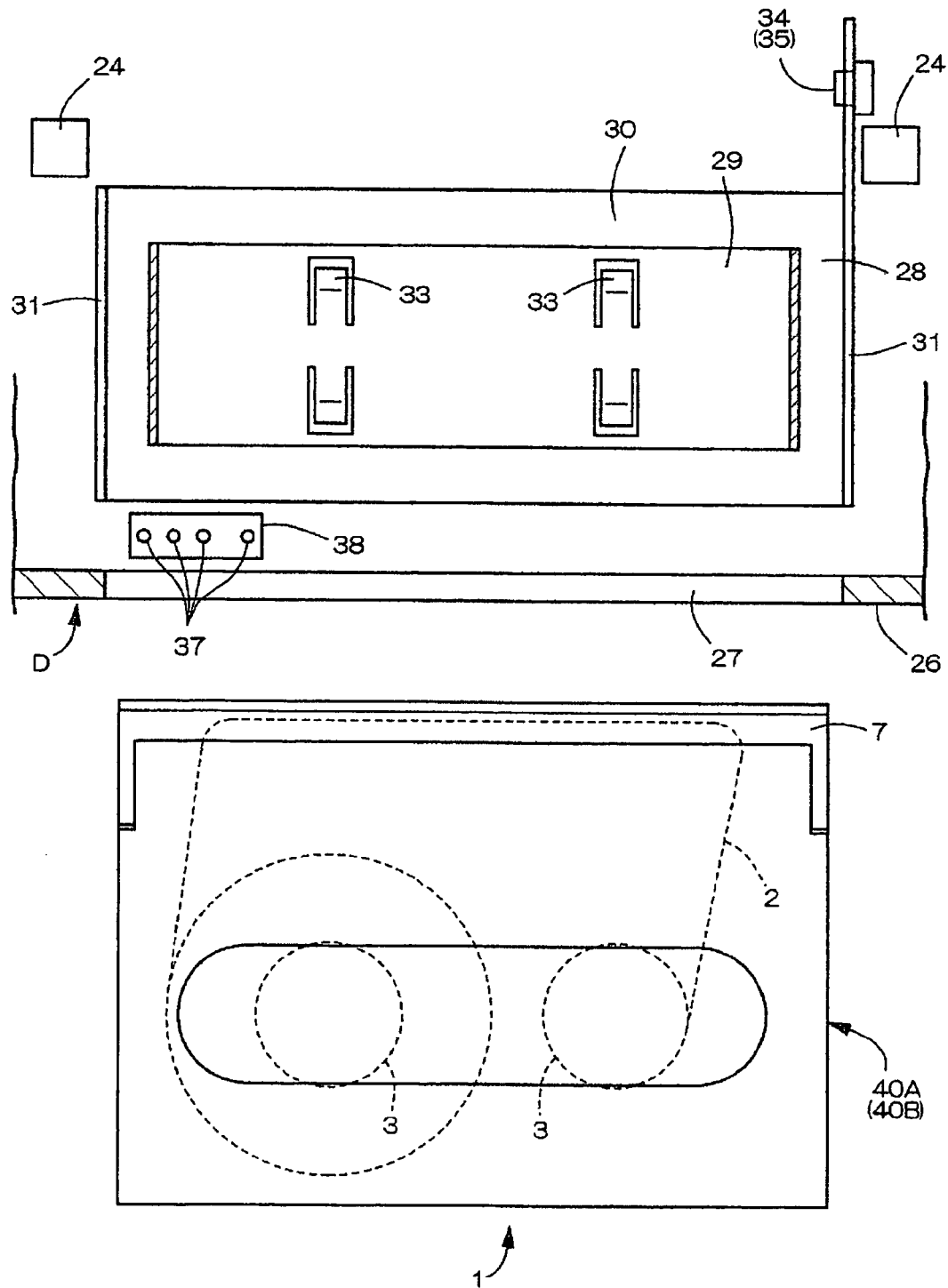
FIG. 6 is a plan view of an interior of the tape drive of the first embodiment.

The tape drive D comprises a loading mechanism for loading each tape cartridge 40A, 40B in common, a drive mechanism for rotating each tape cartridge 40A, 40B in common, a signal recording and reading out mechanism for retrieving the tape 2 of each tape cartridge 40A, 40B from the loading pocket 5 to record and read out information signals with respect to the tape 2, and a control circuit for controlling each mechanism which are accommodated within a rectangular box-like case 26. As shown in FIG. 1 and FIG. 6, the loading mouth 27 is formed in a front surface of the case 26 so as to receive each tape cartridge 40A, 40B for loading.

As shown in FIG. 1 and FIG. 6, inside the loading mouth 27 there are a loading frame 28 for receiving and supporting each tape cartridge (40A, 40B) inserted through the loading mouth 27 and a holder 29 for pressing and holding each tape cartridge 40A, 40B in corporation with the loading frame 28. The loading frame 28 is a metallic molded article having a U-shaped cross-section formed by integrating a bottom wall 30 for supporting a lower surface of each tape cartridge 40A, 40B with side walls 31, 31 projecting upward from opposed left and right ends of the bottom wall 30 so as to restrict left and right movements of the tape cartridge 40A, 40B.

The loading frame 28 is provided at left and right portions of an upper surface of the bottom wall 30 with lock releasing pieces 32 adapted to engage with guide grooves 12 formed in the lower surface of each tape cartridge 40A, 40B for releasing lock pawls 9 simultaneously with the relative sliding of the shutter 8 form its closed position to its opened position.

The holder 29 is actuated in the upper and lower directions by an actuating mechanism (not shown) so as to be displaced to a level suitable for each tape cartridge 40A, 40B. When explaining in more detailed, the holder 29 is adapted to be vertically moved between an upper position where it is in contact with the upper surface of the thick-type tape cartridge 40B so as to press and hold the cartridge as shown in FIG. 8 and FIG. 9 and a lower position where it is in contact with the upper surface of the thin-type tape cartridge (40A) so as to press and hold the cartridge as shown in FIG. 1(a) and FIG. 7(a)(b) as well as normally to be located in the upper position. Incidentally, the upper position shown in FIG. 8 and FIG. 9 is the same as the level of the holder 29 shown in FIG. 1(a). A leaf spring 33 for pressing and holding the upper surface of the main body case 1 is fixedly secured to the lower surface of the holder 29.

When the holder 29 is located in the upper position, an opening height defined by a space dimension between the holder 29 and the bottom surface 30 of the loading frame 28 opposed to each other is large enough for the thin-type tape cartridge 40A to be loaded into the tape drive D. Thereupon, however, it is impossible to press and hold the thin-type tape cartridge 40A by the holder 29. If the driving mechanism or the signal reading and recording mechanism is operated in that condition, the tape drive D falls into trouble. In addition, since the level positions of the detection light entrance 16 and the detection light exit 17 for the above described tape end the detection and also the projecting distance of the pivoting front lid 7 are different in the thin-type tape cartridge 40A and the thick-type tape cartridge 40B, also in this case, it is apprehended that when the driving mechanism or the like is operated without judging the loaded tape cartridge 40A, 40B being the thin-type or the thick-type, the tape drive D falls into trouble.

In order to avoid such trouble, a pair of sensors 34, 35 for detecting the case thickness of the loaded tape cartridge are disposed in the side wall 31 of the loading frame 28, so that the type of the loaded tape cartridge can be judged to be the thin-type one 40A or the thick-type one 40B.

As shown in FIG. 1, an effective point of the lower sensor 35 is located below a reference level defined by an upper surface of the thin-type tape cartridge 40A, while an effective point of the upper sensor 34 is located above the reference level. Therefore, as shown in FIG. 1(b), when the thin-type tape cartridge 40A is loaded, only the lower sensor 35 is turned ON, so that the loaded tape cartridge can be judged as the thin-type tape cartridge 40A.

On one hand, as shown in FIG. 8, when the thick-type tape cartridge 40B is loaded, both the upper and lower sensors 34, 35 are turned ON, so that the loaded tape cartridge can be judged as the thick-type tape cartridge 40B. As these sensors 34, 35 may be used a micro-switch, a proximity switch or a photo-switch. The important matter is that its effective point has the above-mentioned positional relationship.

Next, an operation of the record drive D having the above-mentioned arrangement will be explained. As shown in FIG. 1, when the thin-type tape cartridge 40A is loaded onto the bottom wall 30 of the loading frame 28 through the loading mouth 27, the lock releasing pieces 32 arranged in an upper surface of the bottom wall 30 are engaged with the guide grooves 12 so as to release the locking pawls 9 (FIG. 3) and then, as shown in FIG. 1(b) to make the shutter 8 slide relatively from its closed position to its opened position. Thereupon, since the holder 29 is located in the upper position, the thin-type tape cartridge 40A can be loaded smoothly into the tape drive D.

As shown in FIG. 1(b), when the thin-type tape cartridge 40A reaches the attachment positions of the sensors 34, 35, only the lower sensor 35 is turned ON. Thereupon, the tape drive judges that the loaded tape cartridge is the thin-type tape cartridge 40A, and the holder 29 is displaced from the upper position to the lower position so as for the leaf spring 33 to press and hold the upper surface of the main body case 1. Simultaneously, a stroke of the pin 36 is set to a short distance, and the front lid 7 is pushed up that short distance by the pin 36 so as to be opened.

And then the tape end detecting unit 24 is displaced from a normal high position as shown in FIG. 7(a) to a low position corresponding to level positions of the entrance 16 and the exit 17 for the thin-type tape cartridge 40A as shown in FIG. 7(b). After that, the identification hole detection unit 38 is moved upward, and the identification pin 37 is inserted into the identification hole 25 so as to sense a depth of each identification hole 25, so that a type of the tape 2, a length thereof and so on can be identified on the side of the tape drive D. Based on the type information of the tape obtained by the identification hole detection unit 38, the drive mechanism, the signal reading and recording mechanism and so on are operated so that the reading and recording of the information signals can be performed for the tape 2.

As shown in FIG. 8, in the case of the thick-type tape cartridge 40B, since the holder 29 is located in the upper position, the thick-type tape cartridge 40B can be forcibly pushed and inserted into the tape drive D through the loading mouth 27 flexing the leaf spring 33 a little so as to be loaded therein. When the thick-type tape cartridge 40B reaches the attachment position of the sensors 34, 35, both the sensors 34, 35 are turned ON so that the tape drive D can judge that the loaded tape cartridge is the thick-type tape cartridge 40B.

In this case, as shown in FIG. 9(a), a stroke of the pin 36 is set to a long distance, and the front lid 7 is pushed up by that long distance so as to be opened. Incidentally, since the holder 29 is located in the upper position wherein the thick-type tape cartridge 40B can be pushed and held thereby previously, it is unnecessary to move the holder 29. Further, as shown in FIGS. 9(a)(b), since the tape end detection unit 24 is previously located at the high position corresponding to the entrance 16 and the exit 17 of the thick-type tape cartridge 40B, it is also unnecessary to move the tape end detection unit 24. Other operations, for example an operation of the identification hole detection unit 38, an operation of the reading and recording mechanism and so on are the same as those of the thin-type tape cartridge 40A.

According to the tape drive D having the above-mentioned structure, the holder 29 can be moved between the upper position and the lower position based on the detection signal corresponding to the tape cartridge 40A, 40B sensed by the sensor 34, 35, so that the holder 29 can be displaced to a position suitable for the loaded tape cartridge 40A, 40B. Therefore, even when the thin-type tape cartridge 40A is loaded, it becomes possible to surely press and hold the cartridge 40A by the holder 29 so that the cartridge 40A becomes immovable in the upper and lower directions to surely prevent the breaking down of the tape drive D which might be caused by its vertical swinging.

In addition thereto, there is such a two-stage displaceable configuration that the holder 29 can be displaced to the lower position only when the holder 29 is located in the upper position so as to be in contact with the upper surface of the thick-type tape cartridge 40B in a normal condition for the pressing and the holding of it as well as the loaded tape cartridge is judged as the thin-type tape cartridge 40A by the sensor 35. Accordingly, in comparison with such a multi-stage displaceable configuration that the holder 29 is located above the upper surface of the thick-type tape cartridge 40B in the normal condition and displaced to each height positions of the tape cartridge 40A, 40B detected by the sensors 34, 35, the two-stage displaceable configuration of the present invention can have an actuating construction for the holder 29 simplified and the tape drive D cost-cut and compactified.

Further, since the thickness of each tape cartridge 40A, 40B can be surely sensed by the paired upper and lower sensors 34, 35 as mentioned above, a total cost of the tape drive D can be further reduced in comparison with a mechanical sensing configuration for sensing the thickness of each tape cartridge 40A, 40B.

Since the tape end detecting unit 24 and the pin 36 for pushing up the front lid 7 for opening on the side of the tape drive D are used in common with both the thin-type and the thick-type tape cartridges 40A, 40B, the structure for sensing the tape end and a structure for opening and closing the front lid 7 arranged within the tape drive D can be simplified to reduce a total cost of the tape drive and to compactify the tape drive.

Besides the tape cartridge described in the above-mentioned embodiment, the present invention is also applicable to the tape drive D for the compatible tape cartridges of other type comprising the main body cases 1 having different thicknesses.

Second Embodiment

Figure 10:
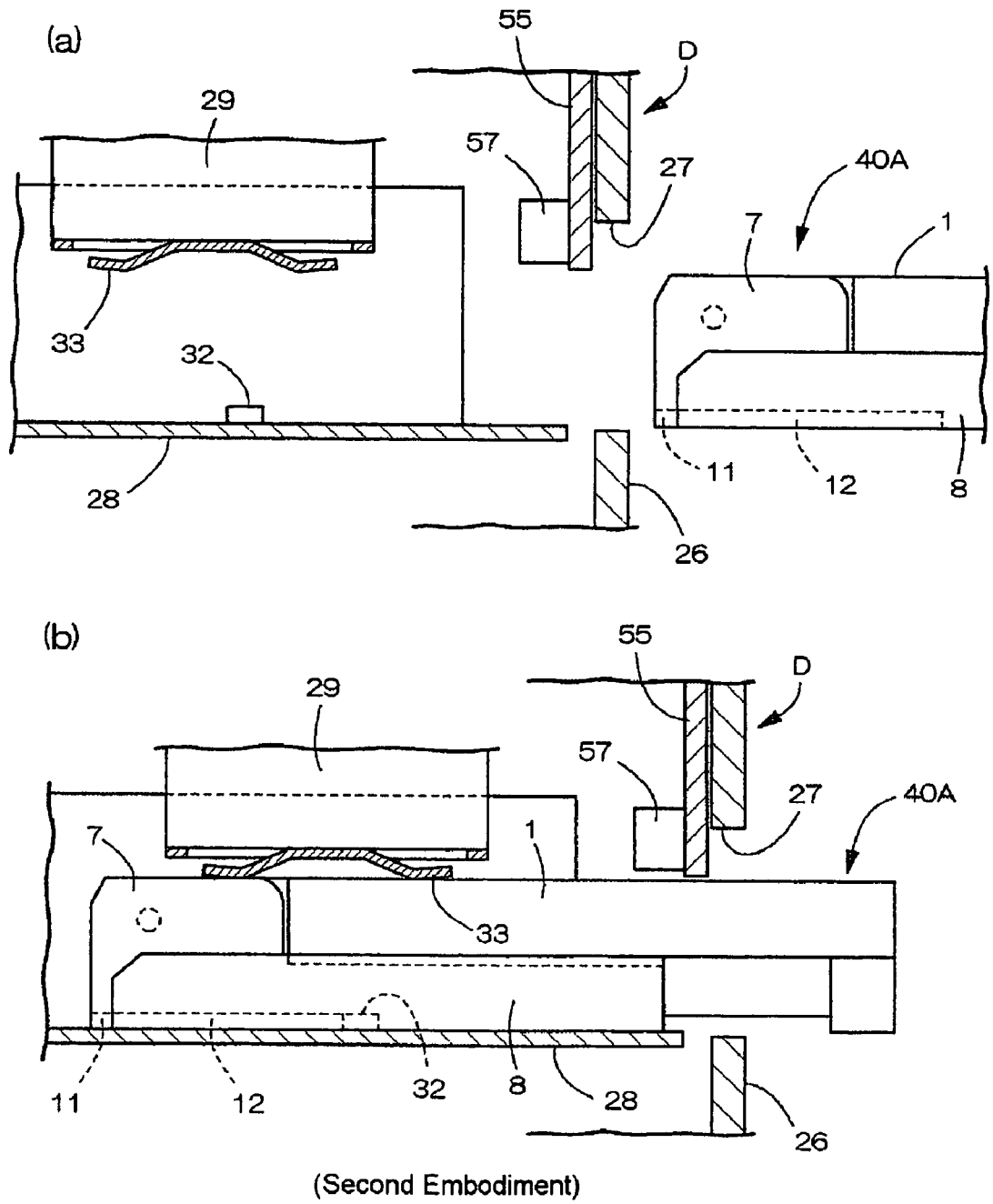
FIG. 10 is a vertical sectional side view showing an arrangement around a loading mouth of a tape drive according to a second embodiment of the present invention.
Figure 11:
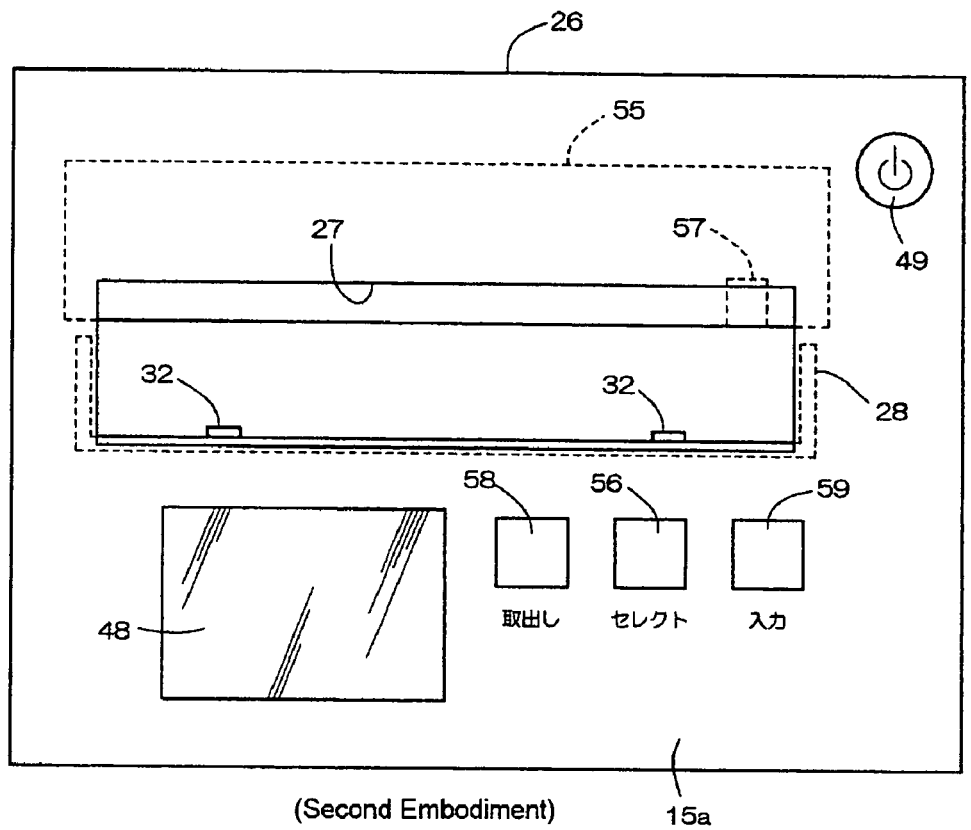
FIG. 11 is a front view of the tape drive of the second embodiment.
Figure 12:
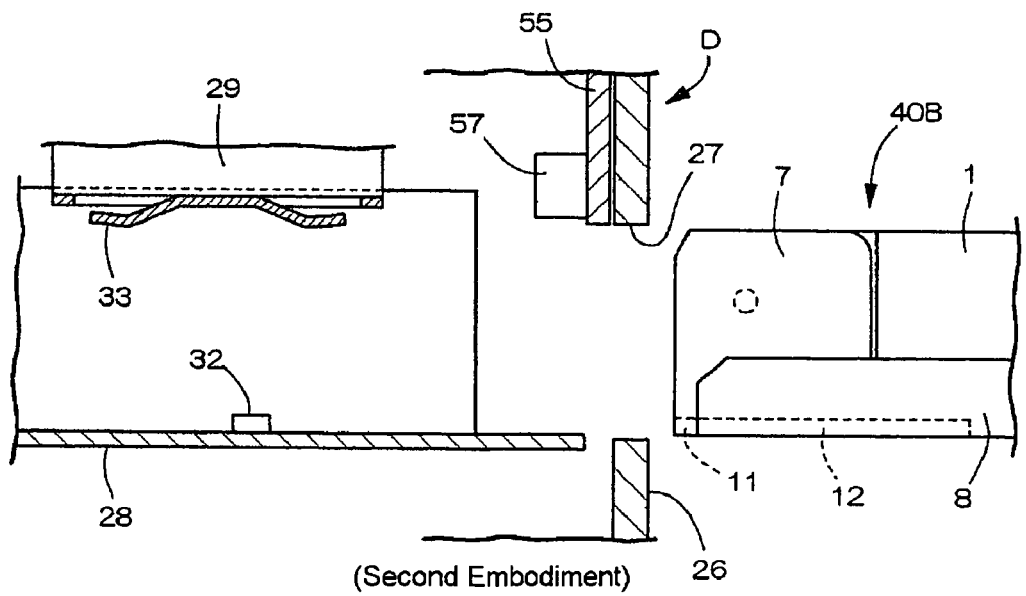
FIG. 12 is a vertical sectional view showing such a condition that the thick-type tape cartridge is going to be loaded to the tape drive of the second embodiment.
Figure 13:
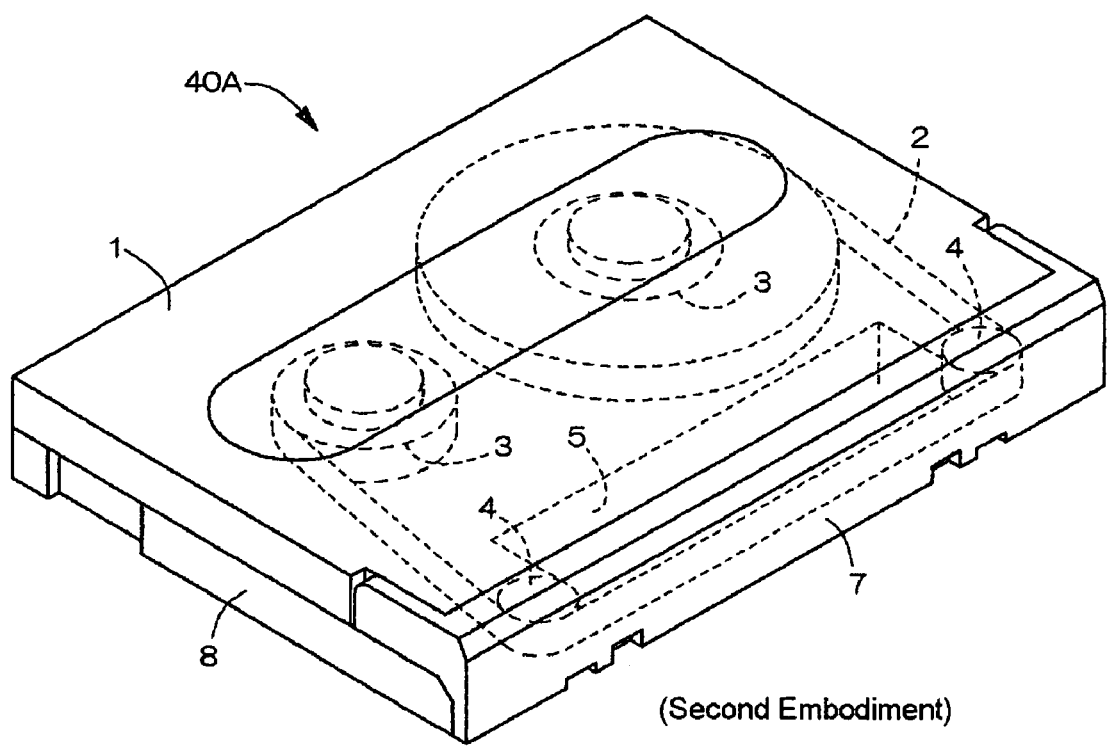
FIG. 13 is a perspective view of the thin-type tape cartridge for use in the second embodiment.

FIG. 10 to FIG. 12 show a second embodiment of a tape drive D according to claims 4 to 6 of the present invention. The thin-type tape cartridge 40A and the thick-type tape cartridge 40B as an application object for the tape drive D are the same as those described above. FIG. 13 is a perspective view of the thin-type tape cartridge 40A with the front lid 7 closed in view from above.

The tape drive D according to the second embodiment is substantially the same as the one according to the first embodiment and comprises the loading mechanism for loading each tape cartridge 40A, 40B in common into the square box-like case 26, the driving mechanism for rotatively driving each tape cartridge 40A, 40B in common, the signal reading and recording mechanism for retrieving the tape 2 from the loading pocket 5 so as to read and record the information signals with respect to the tape 2 in common, the control circuit for controlling the respective mechanisms and so on. One loading mouth 27 through which each tape cartridge 40A, 40B is loaded is opened in the operation panel 15a provided in the case front surface.

Operating members such as an ejector switch 58, a selecting switch 56, an input switch 59 and so on are arranged below the loading mouth 27, and a liquid crystal display 48 for displaying operational conditions or the likes of the tape drive is arranged on the lateral side of the loading mouth 27. The symbol 49 designates an electrical source switch.

As shown in FIG. 10, inside of the loading mouth 27 there are provided the loading frame 28 for receiving and supporting each tape cartridge 40A, 40B inserted from the loading mouth 27, the holder 29 for pressing and holding each tape cartridge 40A, 40B in cooperation with the loading frame 28, and the shelter 55 for changing over an opening height of the loading mouth 27 between the fully opened position and the controlled position.

As previously described, the loading frame 28 is adapted to be vertically raised to the upper stand-by position and lowered from the stand-by position to the operation position, and drive shafts (not shown) thereof can be engaged with hubs 3, 3 of each tape cartridge 40A, 40B by using that lowering operation. The loading frame 28 has the lock releasing pieces 32 provided on the left and the right sides of the loading frame 28 so as to engage with grooves 12 formed in bottom surface of each tape cartridge 40A, 40B and to release the lock pawls 9 as well as to make the shutter 8 slide relatively between the closed position and the opened position. As described later, the lock releasing projections 32 serve as projections for judging the upper side and the lower side of each tape cartridge 40A, 40B.

The holder 29 and the shelter 55 are vertically moved simultaneously by an operation mechanism (not shown) so as to be displaced to a level matching with each tape cartridge 40A, 40B. An opening height of the loading mouth 27 can be changed over between the fully opened position and the controlled position by the shelter 55. In the fully opened position shown in FIG. 12, the loading of the thick-type tape cartridge 40B is allowed, and in the controlled position shown in FIG. 10, only the loading of the thin-type tape cartridge 40A is allowed. The operations of the holder 29 and the shelter 55 can be changed over upward or downward depending on the signal instruction designated by the above-mentioned selecting switch 56.

When the shelter 55 and the loading mouth 27 are in the fully opened position, the thin-type tape cartridge 40A can be loaded through the loading mouth 27 having its opening height increased. But, the holder 29 can't press and hold the thin-type tape cartridge 40A. If the driving mechanism and/or the signal reading and recording mechanism are operated in that condition, the tape drive D falls into a trouble. In order to surely avoid such a trouble, a sensor 57 is provided in a lower portion of the inside of the shelter 55 so that it becomes possible to judge whether the thickness of the tape cartridge now loaded is coincident with the thickness of the tape cartridge designated by the selecting switch 56 or not. This sensor 57 is also capable of judging such a case that a tape cartridge of the nontarget type is loaded. As the sensor 57 may be used a micro-switch, a proximity switch, a photo-switch or the like.

The ejector switch 58 serves to eject each tape cartridge 40A, 40B loaded to the tape drive D, and the selecting switch 56 serves to designate the thin-type or the thick-type tape cartridge 40A, 40B to be loaded from now. The input switch 59 serves to specify required parameters, recording matters correspondingly to a display in a liquid crystal screen 48.

The lock releasing pieces 32 are arranged on the left and the right sides of the loading frame 28 correspondingly to the guide grooves 12 of the shutter 8. Therefore, when each tape cartridge 40A, 40B is inserted into the loading mouth 27 for loading, the lock releasing projections 32 engage with the guide grooves 12 to release the lock pawls 9 so as to make the shutter 8 slide relatively from the closed position to the opened position. The lock releasing pieces 32 serve as such projections as to confirm that the tape cartridge 40A, 40B is loaded in a correct posture or not, i.e. in more detail to confirm that the upper side and the lower side of the main body case 1 are not inverted. For example, even when the thin-type tape cartridge 40A is inserted into the loading mouth 27 in the inverted condition, since the front lid 7 is received by the lock releasing pieces 32, the main body case 1 can't be inserted any longer, which can make a user to recognize that the loading posture is not correct.

According to the tape drive D of the second embodiment as constructed above, since the shelter 55 and the holder 29 can be vertically operated between the fully opened position and the closed position based on the output signal corresponding to the tape cartridge selected by the selecting switch 56 so as to change the opening height of the loading mouth 27 and the height of the holder 29 to such a height as matching with the tape cartridge to be loaded, the tape drive D can be operated only in such a condition that the tape cartridge having the suitable size is loaded. In addition, it becomes possible to surely prevent the loading of the tape cartridge having its upper side and its lower signal inverted.

In the second embodiment, though the holder 29 can be vertically operated simultaneously with the shelter 29, the holder 29 and the shelter 55 may be operated separately. Besides the guide grooves 12 and the lock releasing pieces 32, the tape cartridge may be provided with dedicated grooves or projections for use in the judging of the upper side and the lower side. Especially, in the case of the tape cartridge without the shutter 8, at least a pair of grooves and projections may be provided in a portion corresponding thereto. Thereupon, the projections may be formed in the tape cartridge, and the grooves may be formed in the holder 29.

Third Embodiment

FIGS. 14 to 17 show a third embodiment of a tape drive D according to claims 7 to 10 of the present invention. The thin-type tape cartridge 40A and the thick-type tape cartridge 40B as the application target are the same as those previously described.

Figure 15:
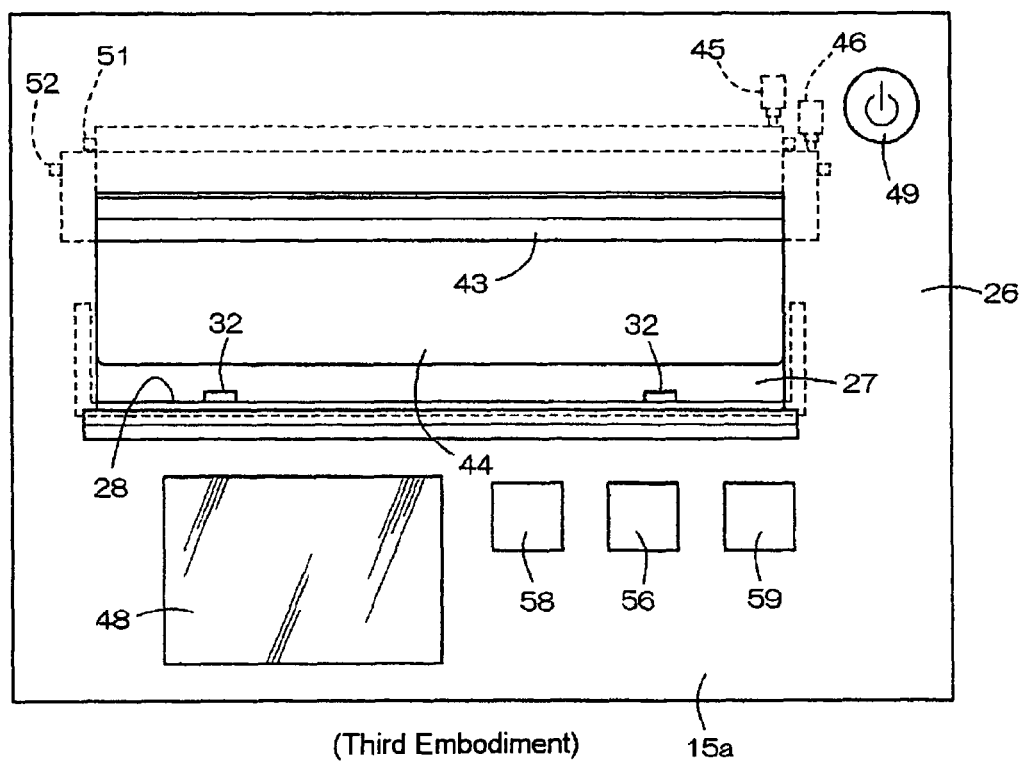
FIG. 15 is a front view of the tape drive of the third embodiment.

The tape drive D according to the third embodiment comprises the loading mechanism for loading each tape cartridge 40A, 40B in common into the square box-like case 26, the driving mechanism for rotatively driving each tape cartridge 40A, 40B in common, the signal reading and recording mechanism for retrieving the tape 2 from the loading pocket 5 so as to read and record the information signals with respect to the tape 2 in common, the control circuit for controlling the respective mechanisms and so on. One loading mouth 27 through which each tape cartridge 40A, 40B is loaded is opened in the operation panel 15a provided in the case front surface as shown in FIG. 15. A plurality of control buttons (corresponding to the ejector switch 58, the selecting switch 56, and the input switch 59 in the second embodiment) are arranged below the loading mouth 27, and a liquid crystal screen 48 for displaying operation conditions and so on is arranged on the lateral side of those.

As shown in FIG. 1 and FIG. 5, inside of the case 26 there are provided the loading frame 28 for receiving and supporting each tape cartridge 40A, 40B inserted through loading mouth 27, and the holder 29 for pressing and holding each tape cartridge 40A, 40B in cooperation with the loading frame 28. Inside of the loading mouth 27, there are provided a first door 43 and a second door 44 adjacent to first door 43 inside thereof for closing the loading mouth 27.

The loading frame 28 is fixedly supported by the case 26. By raising driving shafts disposed on the side of the lower surface of the loading frame 28, the driving shafts can be made to engage with the hubs 3, 3 of each tape cartridge 40A, 40B for connection thereto as well as the front lid 7 can be opened by an operation pin raised together with the driving shafts. The loading frame 28 is provided on the left and right sides in its upper surface with the lock releasing pieces 32 which engage with grooves 12 formed in bottom surface of each tape cartridge 40A, 40B and to release the lock pawls 9 as well as simultaneously to make the shutter 8 slide relatively from the closed position to the opened position. This lock releasing pieces 32 serve to judge the upper side and the lower side of each tape cartridge 40A, 40B.

Figure 16:
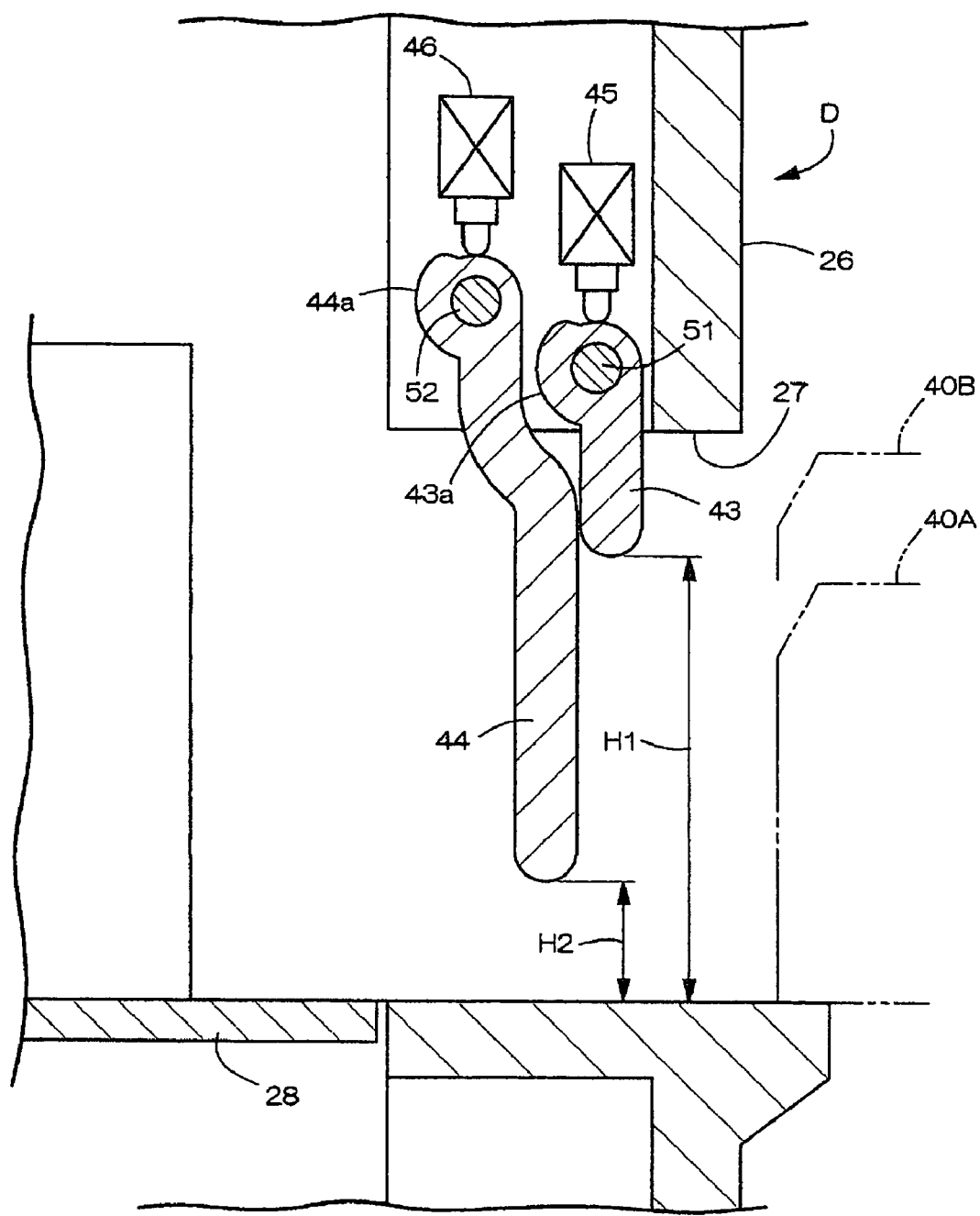
FIG. 16 is a vertical sectional side view around the loading mouth when the tape drive of the third embodiment is in its unused state.

As shown in FIG. 16, the first door 43 and the second door 44 are resiliently urged by a spring (not shown) to a shielding position for shielding the loading mouth 27 as well as pivotally supported by door shafts 51, 52 supported by the case 26 so as to be opened and closed about the shafts 51, 52, namely so as to swing between a shielding position for shielding the loading mouth 27 and a retreat position in which they are made to swing toward the inside of the case 26 interlockingly with the loading operation of the tape cartridge 40A, 40B.

The opened state and the closed state of each door 43, 44 is utilized for detecting a case thickness of each tape cartridge 40A, 40B. That is, as shown in FIG. 16, a vertical space H1 between a lower end of the first door 43 and an opening lower edge of the loading mouth 27 is set larger than a vertical space H2 between a lower end of the second door 44 and the opening lower edge of the loading mouth 27. Further, the opened state and the closed state of each door 43, 44 can be detected by a first and a second sensors 45, 46 respectively.

Concretely, the vertical space H1 between the lower end of the first door 43 and the opening lower edge of the loading mouth 27 is set larger than the vertical thickness of the thin-type tape cartridge 40A as well as smaller than the vertical thickness of the thick-type tape cartridge 40B. The vertical space H2 between the lower end of the second door 44 and the opening lower edge of the loading mouth 27 is set smaller than the vertical thickness of the thin-type tape cartridge 40A. In other words, when the thin-type tape cartridge 40A is loaded through the loading mouth 27, only the second door 44 is made to swing for opening, and when the thick-type tape cartridge 40B is loaded through the loading mouth 27, both the first and the second doors 43, 44 are made to swing for opening.

The first and the second sensors 45, 46 are constructed by a switch adapted to change over to the ON state interlockingly with the retreat swinging of the first and the second doors 43, 44. The first and the second doors 43, 44 are provided at their proximal ends with actuator cams 43a, 44a for actuating both the sensors 45, 46 for switching respectively. When the door 43, 44 is made to swing by a certain angle for retreat, the actuator cam 43a, 44a makes the first or the second sensor 45, 46 switch to ON and maintain the ON state. When the door 43, 44 is returned to the shielding position, each sensor 45, 46 is returned to the OFF state.

The holder 29 can be raised by an actuating mechanism and then each sensor 45, 46 can be switched to the ON state. Further, when the completion of the loading of the tape cartridge is sensed by another sensor, the holder 29 is lowered to either of a height suitable for holding the thin-type tape cartridge 40A or a height suitable for holding the thick-type tape cartridge 40B so as to securely hold each tape cartridge 40A, 40B in cooperation with the loading frame 28. For attaining that, the leaf spring 33 for pressing and holding the main body case 1 is fixedly secured to the lower surface of the holder 29.

Figure 14:
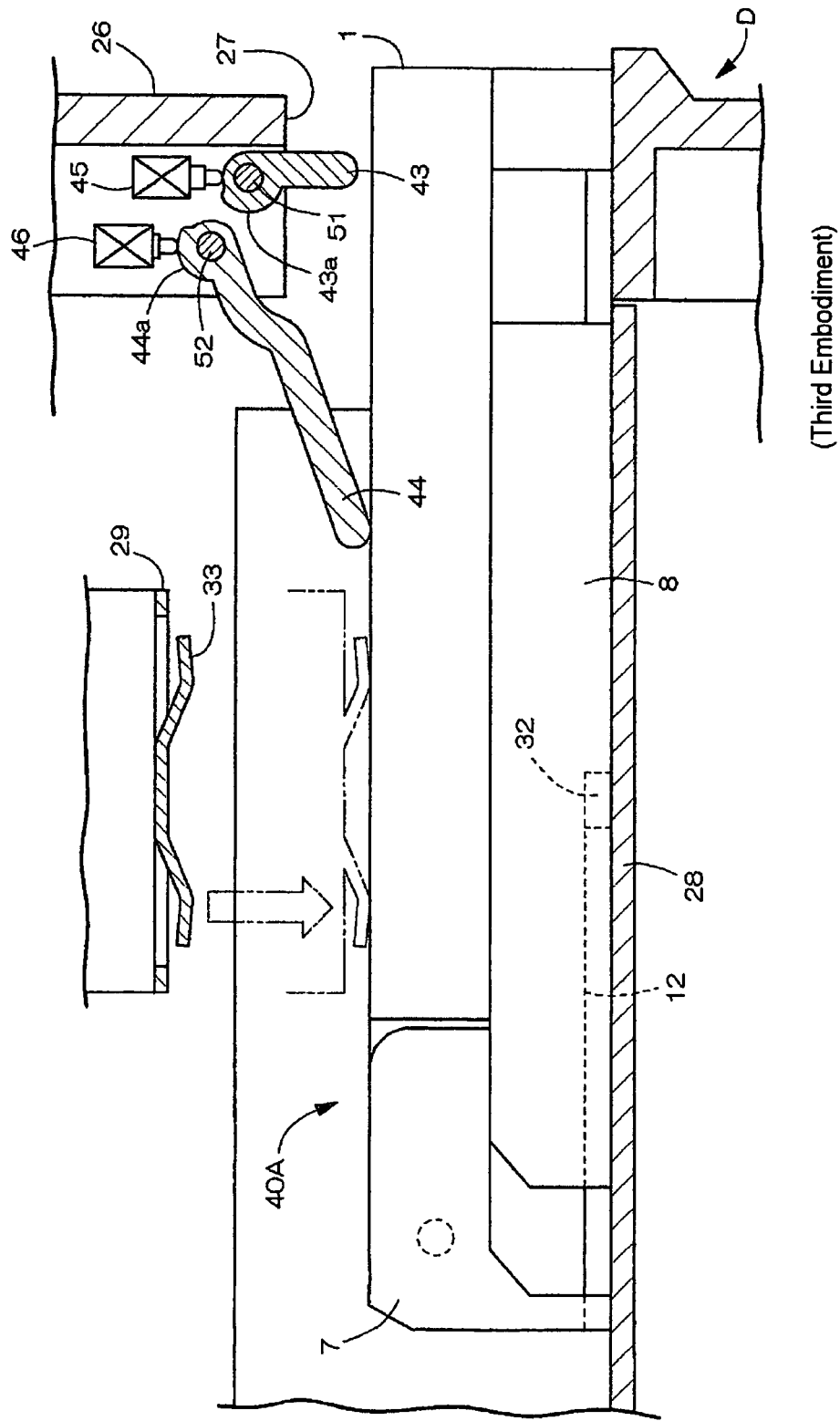
FIG. 14 is a vertical sectional front view of a tape drive according to a third embodiment of the present invention to which the thin-type tape cartridge is loaded.

When the thin-type tape cartridge 40A is loaded through the loading mouth 27 under the use condition, as shown in FIG. 14, only the second door 44 is made to swing for retreat and the ON signal is output from the second sensor 46. When receiving this sensed signal, the control circuit judges that the loaded tape cartridge is the thin-type tape cartridge 40A. And then when the control circuit has received the loading completion signal output from another sensor, the holder 29 is lowered so as to securely hold the main body case 1 in the use posture.

Figure 17:
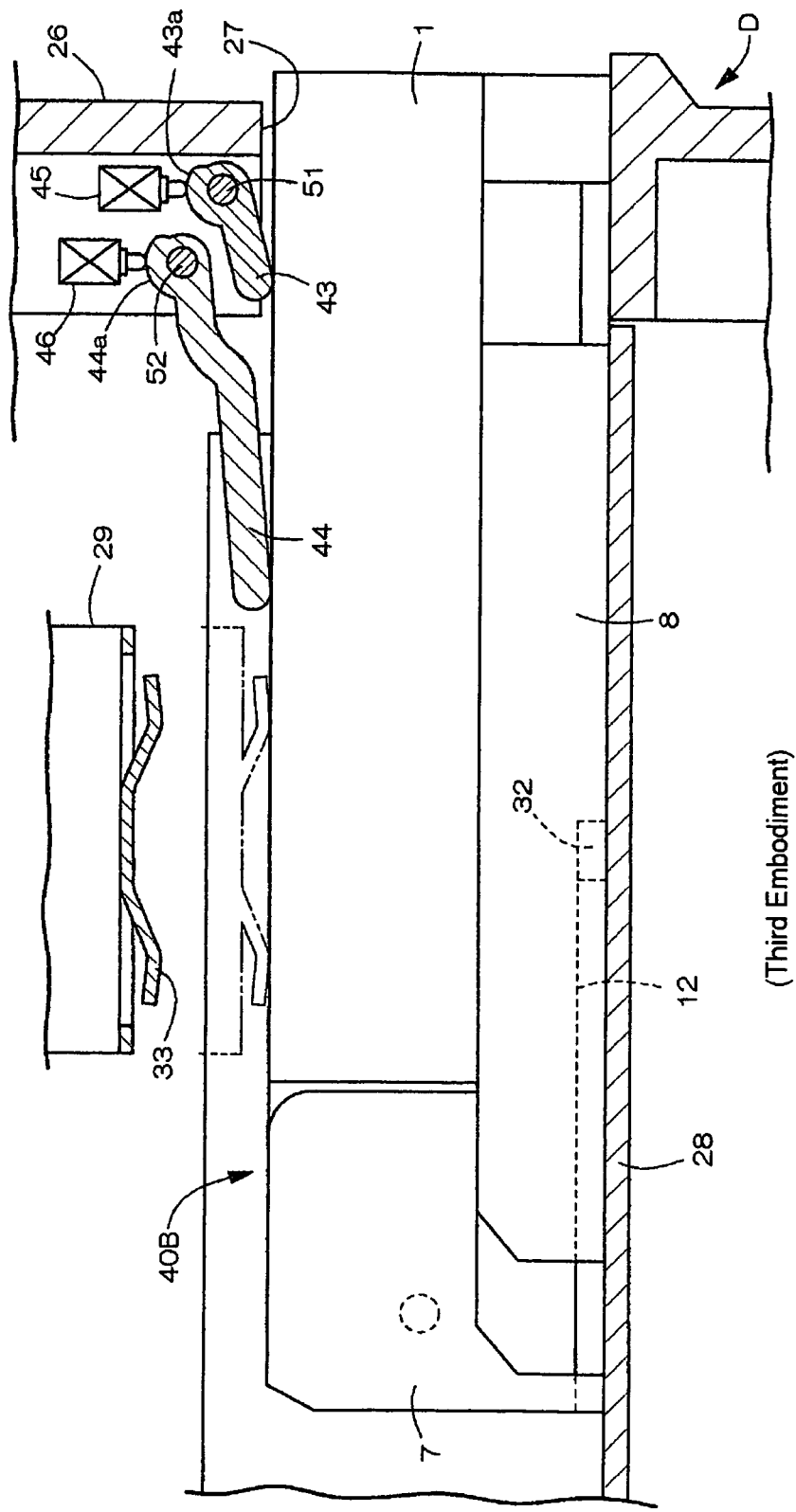
FIG. 17 is a vertical sectional side view showing the tape drive according to the third embodiment to which the thick-type tape cartridge is loaded.
Figure 18:
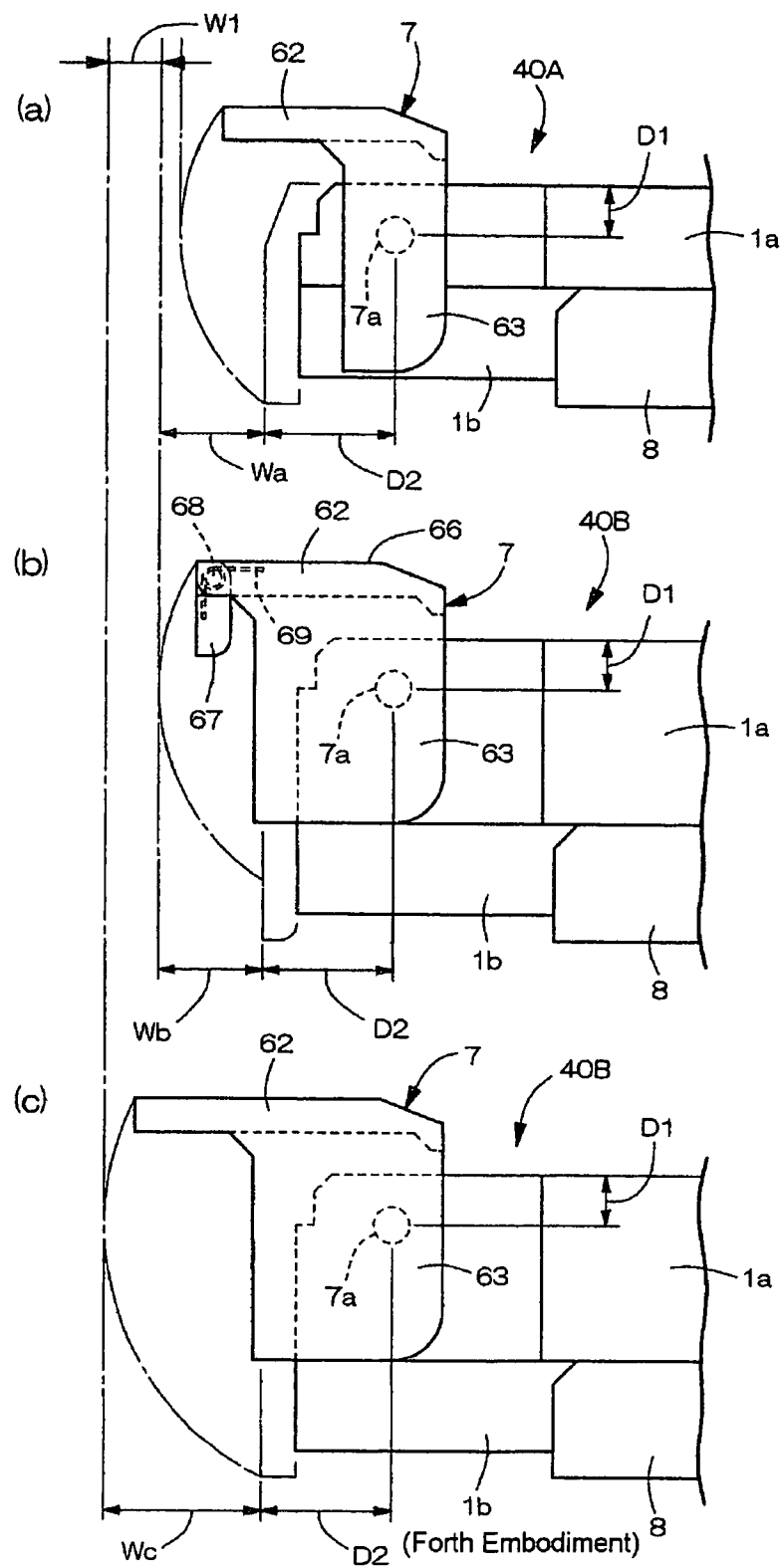
FIG. 18 is a side view for explaining a movement of a front lid of a tape cartridge according to a fourth embodiment of the present invention.

In the case of the thick-type tape cartridge 40B, as shown in FIG. 17, both the first and the second doors 43, 44 are made to swing for retreat and thus the ON signals are output from both the first and the second sensors 45, 46. When receiving these sensed signals, the control circuit judges that the loaded tape cartridge is the thick-type tape cartridge 40B. And then when the control circuit has received the loading completion signal output from another sensor, the holder 29 is lowered so as to securely hold the main body case 1 in the use posture. Incidentally, the holder 29 under unused condition is held at an upper stand-by position.

According to the tape drive D of the third embodiment, a case thickness of the tape cartridge 40A, 40B loaded through the loading mouth 27 can be automatically judged and the holding position of the holder 29 can be made to match with the tape cartridge 40A, 40B. Therefore, it is possible to obtain the tape drive D which is capable of readily performing the reading and recording for the tape cartridges 40A, 40B having different case thicknesses without being conscious of such size differences.

The front lid 7 is opened by the actuator pin 36 raised together with the driving shafts, but the opening stroke of the front lid 7 is different in each tape cartridge 40A, 40B. Therefore, when the thick-type tape cartridge 40B is loaded to the tape drive D, the pushing-up stroke of the actuator pin 36 may be made large based on the ON signals from both the sensors 45, 46.

In the third embodiment, though there is a space between the lower end of the second door 44 and the opening lower edge of the loading mouth 27, the lower end of the second door 44 may be extended so as to be in contact with the opening lower edge of the loading mouth 27 to shield the loading mouth 27 completely during the unused state. By shielding the loading mouth 27 completely by the second door 44 in this way, it is possible to prevent the ingression of dust or foreign material through the loading mouth 27 during the unused state.

Though the micro-switch is used for the first and the second sensors 45, 46 in the third embodiment, various sensors such as a proximity switch, a magnetic switch, a photo-sensor or the like on the market may be used for the sensors 45, 46. When the identification of two or more types of tape cartridges is required, the loading mouth 27 may have the doors arranged in the number corresponding thereto.

Fourth Embodiment

FIGS. 18 to 22 show a fourth embodiment of a tape drive D according to claims 11 to 16 of the present invention. The thin-type tape cartridge 40A has the hubs 3, 3 for taking-up the tape (magnetic tape) 2 on the left and the right sides within the square box like main body case 1, and a pair of left and right tape guides 4, 4 for guiding the tape 2 supplied from one hub 3 to the other hub 3. Since the tape guides 4, 4 are arranged on the left and the right sides in a front portion of the pocket 5 in the case for loading, the tape 2 can be held in the left and right traversing manner in the front portion of the pocket 5. The main body case 1 is divided into an upper case 1a and a lower case 1b, which are coupled like a socket-and-spigot lid engagement so as to form the case 1 like a hollow box.

Figure 21:
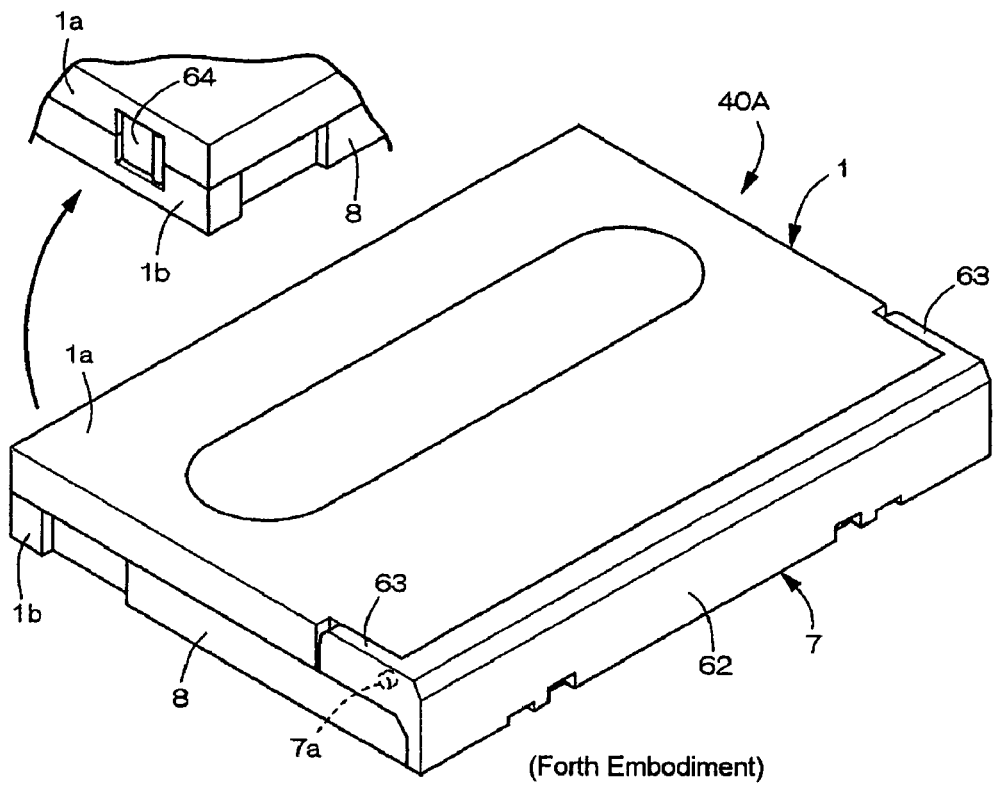
FIG. 21 is a perspective view showing the thin-type tape cartridge for use in the fourth embodiment.

In order to protect the tape 2 during a unused state, the front surface and the upper surface of the pocket 5 are covered by the front lid 7 as well as the lower surface of the pocket 5 is covered by the shutter 8. As shown in FIG. 21, the front lid 7 comprises a front face plate 62 for covering a front opening of the pocket 5 entirely and connection pieces 63 integrally connected to the front face plate 62 so as to extend backward from the left and the right ends of the front face plate 62. Support shafts 7a are projected inward from the respective inside surfaces of the left and the right connection pieces 63, while these support shafts 7a are pivotally supported by holes formed in left and right side walls 15a of the upper case 1a. Thereby, a whole of the front lid 7 is vertically revolved between a closed posture in which the pocket 5 is closed as shown in FIG. 21 and an opened posture in which the lid 7 is located above the upper surface of the pocket 5 as shown in FIG. 18a so as to open the front opening of the pocket 5.

Incidentally, the front lid 7 is always urged toward the closing direction by a spring (not shown) and received and supported by the shutter 8 so as to be unopenable.

Figure 19:
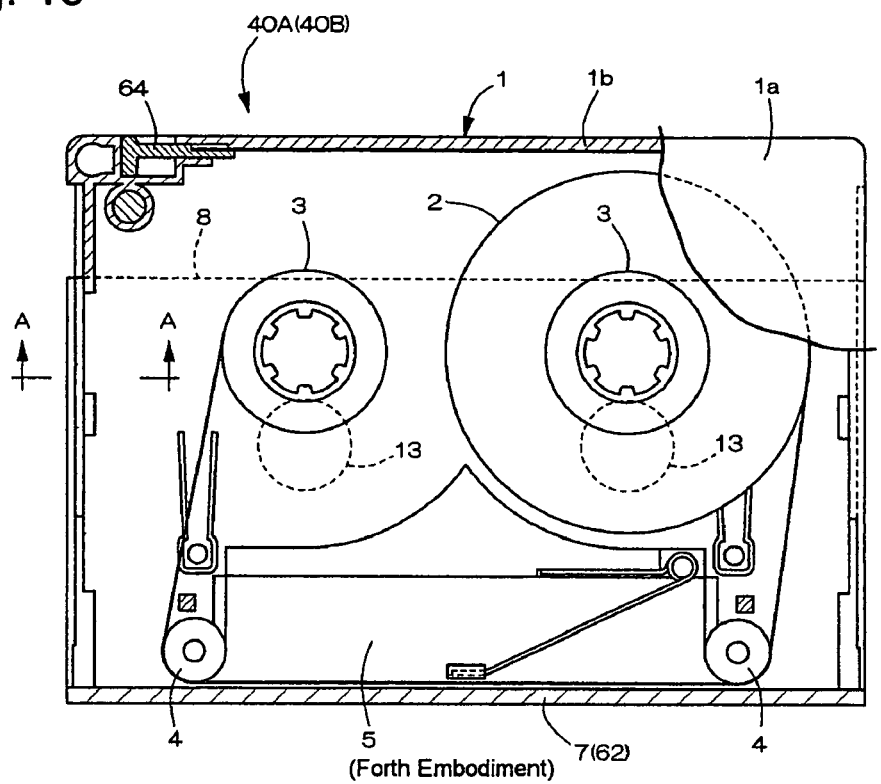
FIG. 19 is a plan view showing an interior of a thin-type tape cartridge for use in the fourth embodiment.
Figure 20:
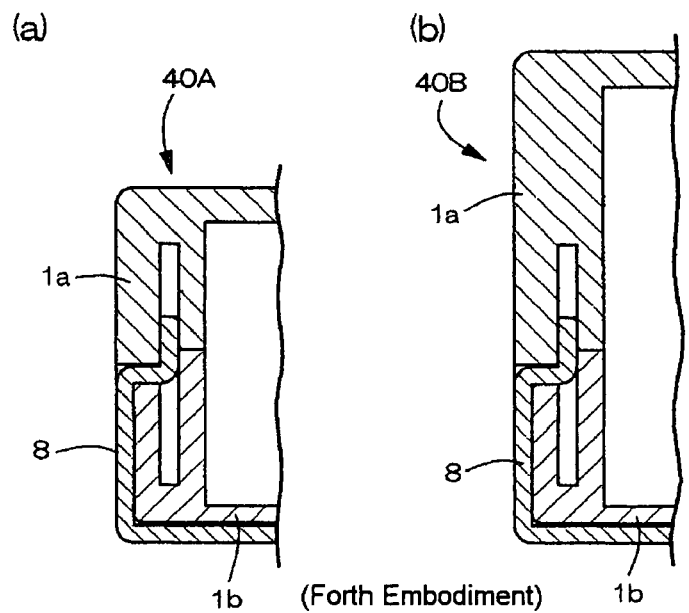
FIG. 20 is a vertical sectional front view taken along the A-A line in FIG. 19.

As shown in FIG. 19 and FIG. 21, the shutter 8 is arranged on the lower surface of the main body case 1 and supported by the main body case 1 so as to be slidable in the fore and rear directions. During the unused state, the shutter 8 is locked so as to be unopenable by a lock pawl (not shown) provided on the side of the main body case 1. During the unused state, the shutter 8 covers the lower side of the pocket 5 as well as covers driving shaft insertion holes opened in the lower surface of the main body case 1 correspondingly to the positions of the hubs 3, 3. When the shutter 8 is moved backward for opening by releasing the lock pawl, the loading pocket 5 and the driving shaft insertion holes can be opened. The symbol 13 in FIG. 19 designates openings to be used for opening the driving shaft insertion holes, and the symbol 64 in FIG. 21 does an erroneous erasing prevention piece arranged so as to be slidable in the left and right directions relative to the main body case 1.

Figure 22:
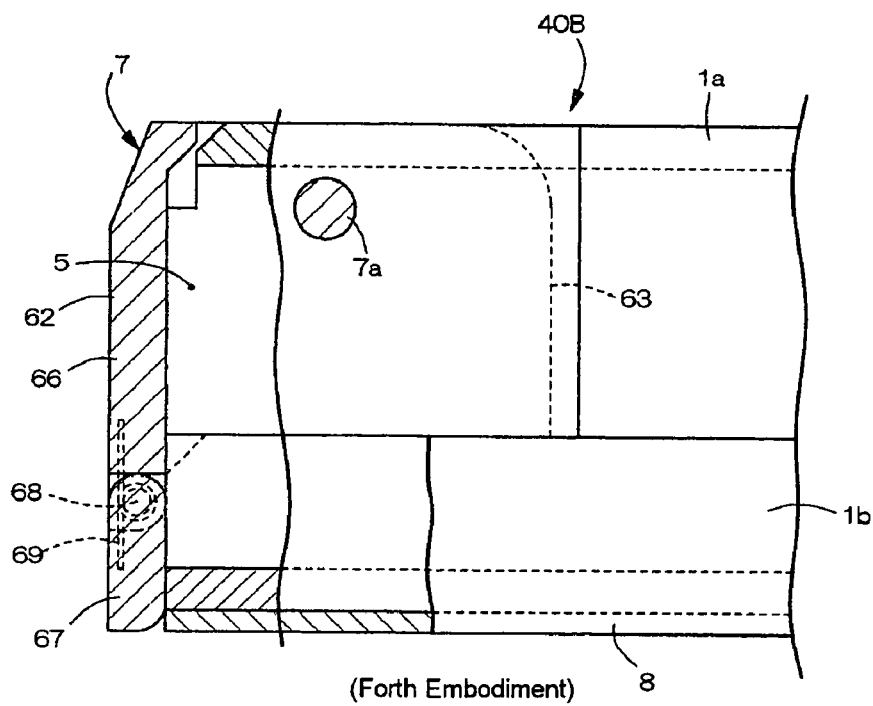
FIG. 22 is a vertical sectional side view showing the thick-type tape cartridge for use in the fourth embodiment.

As described above, since the thick-type tape cartridge 40B shown in FIG. 18(b) and FIG. 22 accommodates the tape 2 twice as wide as that of the thin-type tape cartridge 40A and thus has a thickness of the main body case 1 and a thickness of the hub 3 increased by that.

Additionally in the fourth embodiment, as shown in FIG. 18(b) and FIG. 22, it should be noted that the front face plate 62 of the front lid 7 of the thick-type tape cartridge 40B has a two-component structure which comprises a main face wall 66 which occupies most of the front face plate 62 and is laterally elongated, and an assistant face wall 67 which is pivotally connected to a leading end portion (a lower end portion) of the main face wall 66 so as to be pivotable relative to the main face wall 66.

The assistant face wall 67 is pivotally connected to connection shafts 68 projected inward from the inside of the connection pieces 63 at locations corresponding to the leading end portion of the main face wall 66 as shown in FIG. 22 so as to opposed to each other. The assistant face wall 67 is pivotable about the connection shafts 68 between a linearly aligned posture in which its outer surface becomes coplanar with the outer surface of the main wall 66 as shown in FIG. 22 and a bent posture in which it is bent downward substantially perpendicularly to the main wall 66 as shown in FIG. 18(b). In FIG. 18(b) and FIG. 22, the symbol 69 designates torsion coil springs fitted around the connection shafts 68. By these springs 69, the assistant face wall 67 is pivotally urged to the bent posture as shown in FIG. 18(b). Therefore, when the front lid 7 is in the closed posture as shown in FIG. 22, the assistant face wall 67 takes the linearly aligned posture in which its outer surface becomes coplanar with the outer surface of the main wall 66, and when the front lid 7 is revolved upward from the closed posture, the assistant face wall 67 is snappily displaced to the bent posture by the springs 69.

In the thin-type tape cartridge 40A and the thick-type tape cartridge 40B according to this embodiment, the support shafts 7a are disposed in the same positions with reference to the upper end surface of the upper case 1a and the leading end outer surface of the front lid 7. That is, in the thick-type tape cartridge 40B of FIG. 18(b), a vertical distance D1 is defined by a length between the upper end surface of the upper case 1a and the support shaft 7a as well as a distance D2 is defined by a fore and rear length between the leading end outer surface of the front lid 7 in the closed posture depicted by a phantom line in FIG. 18(b) and the support shaft 7a. In that case, the corresponding distances D1, D2 in the thin-type tape cartridge 40A are set similarly to the above distances D1, D2 in the thick-type tape cartridge 40B. Therefore, the arrangement positions of the support shafts 7a defined by those distances D1, D2 are the same in both the small and large tape cartridges 40A, 40B. Incidentally, FIG. 18(c) shows the thick-type tape cartridge 40B having the front face plate 62 formed as one piece as a comparative example to the present invention, which has the same distances D1, D2 as the above-mentioned ones in the thin-type tape cartridge.

As noted above, since the front face plate 62 of the front lid 7 in the thick-type tape cartridge 40B has the two-component structure which comprises the main wall 66 and the assistant face wall 67 which is pivotally connected to the main wall 66 so as to be pivotable relative to the main wall 66, a projecting distance Wb of the pivoting front lid 7 can be made as close as possible to a projecting distance Wa in the thin-type tape cartridge 40A. Therefore, contributively the tape drive D can be compactified. That is, as shown in FIG. 18(c), in the conventional thick-type tape cartridge 40B having one piece front face plate 62, since the projecting distance Wc of the pivoting front lid 7 defined by a circular movement trace scribed by the front face plate 62 about the support shafts 7a during the opening and closing of the front lid 7 and an outer surface of the front face plate 62 in the closed posture is remarkably large in comparison with the projecting distance Wa in the thin-type tape cartridge 40A shown in FIG. 18(a), it becomes necessary to set the stand-by position of the reading head or the recording head in the tape drive correspondingly to the projecting distance Wc in the thick-type tape cartridge 40B, which becomes a large obstacle for compactification of the tape drive D.

On the other hand, as shown in FIG. 18(b), since the front face plate 62 which constructs the front lid 7 of the thick-type tape cartridge 40B has the two-component structure comprising the main face wall 66 and the assistant face wall 67, it becomes possible to make the projecting distance Wb of the pivoting front lid 7 close to the projecting distance Wa in the thin-type tape cartridge 40A shown in FIG. 18(a). Therefore, it is possible to decrease a depth dimension of the tape drive D by a distance differential (W1=Wc−Wb) between these projecting distances, which resultantly contributes the downsizing and the compactification of the tape drive D. Since the arrangement positions of the support shafts 7a in the thick-type tape cartridge 40B are the same as those in the conventional example (FIG. 19(c)), it is entirely unnecessary to modify a design of the upper case 1a, which advantageously contributes the reducing of a manufacturing cost of the compatible type tape cartridges 40A, 40B.

In the fourth embodiment, as shown in FIGS. 20(a), (b), the lower case 1b is used in common in both the thin-type and the thick-type tape cartridges 40A, 40B, but only the upper case 1a is different in the thickness dimension therein. Since the lower case 1b is used in common in both the tape cartridges 40A, 40B, it becomes possible to reduce the number of component parts and thus to manufacture the compatible type tape cartridge in a low cost.

Though FIG. 18(b) of the fourth embodiment shows that the projecting distances Wa, Wb in the thin-type and the thick-type tape cartridges 40A, 40B are substantially the same, it is more preferable to set the width dimension of the main face wall 62 so that these distances Wa, Wb become the same as each other completely.

Fifth Embodiment

Figure 23:
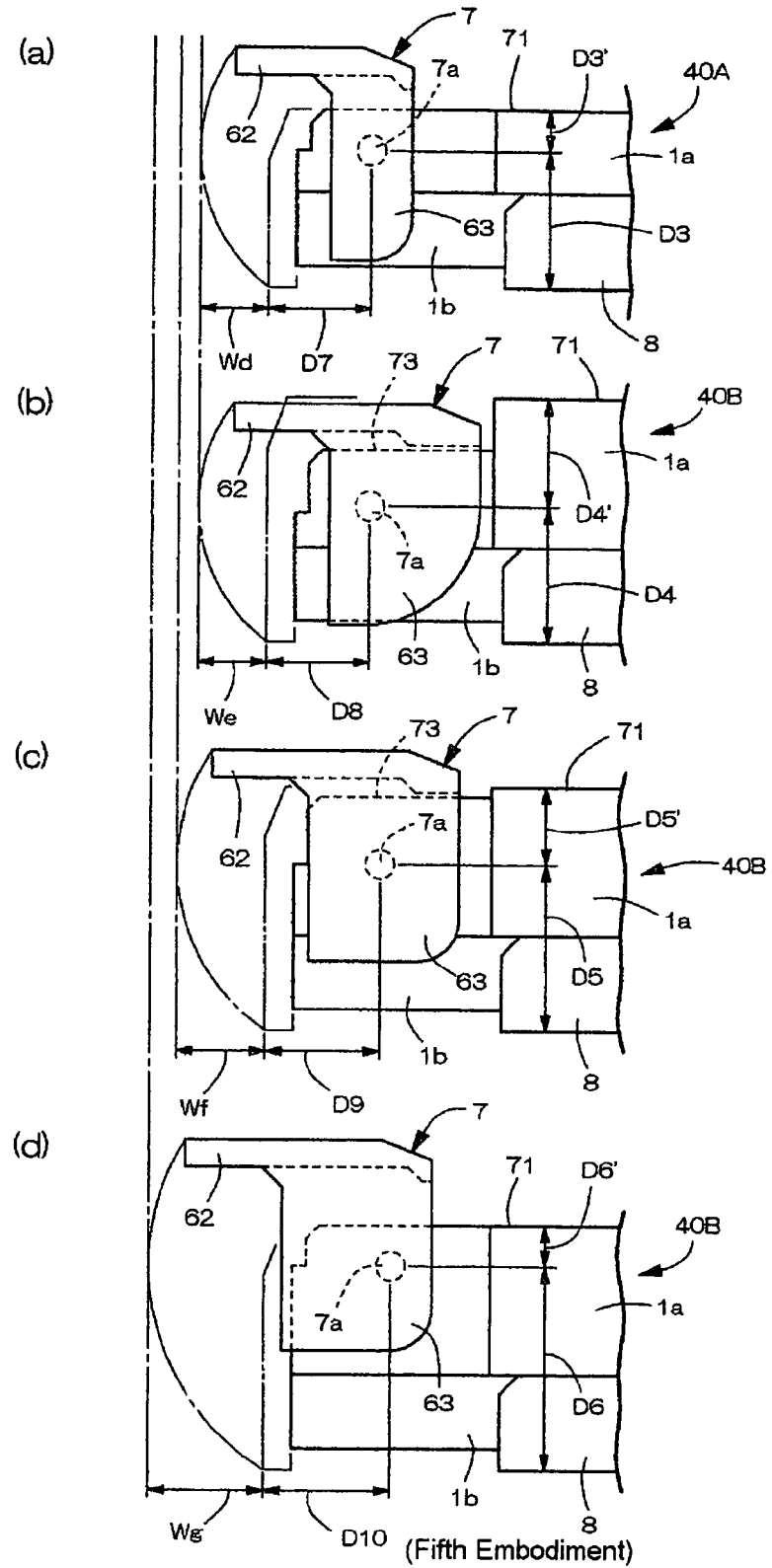
FIG. 23 is a side view for explaining movements of front lids of a large and a small tape cartridges in a fifth embodiment of the present invention.
Figure 24:
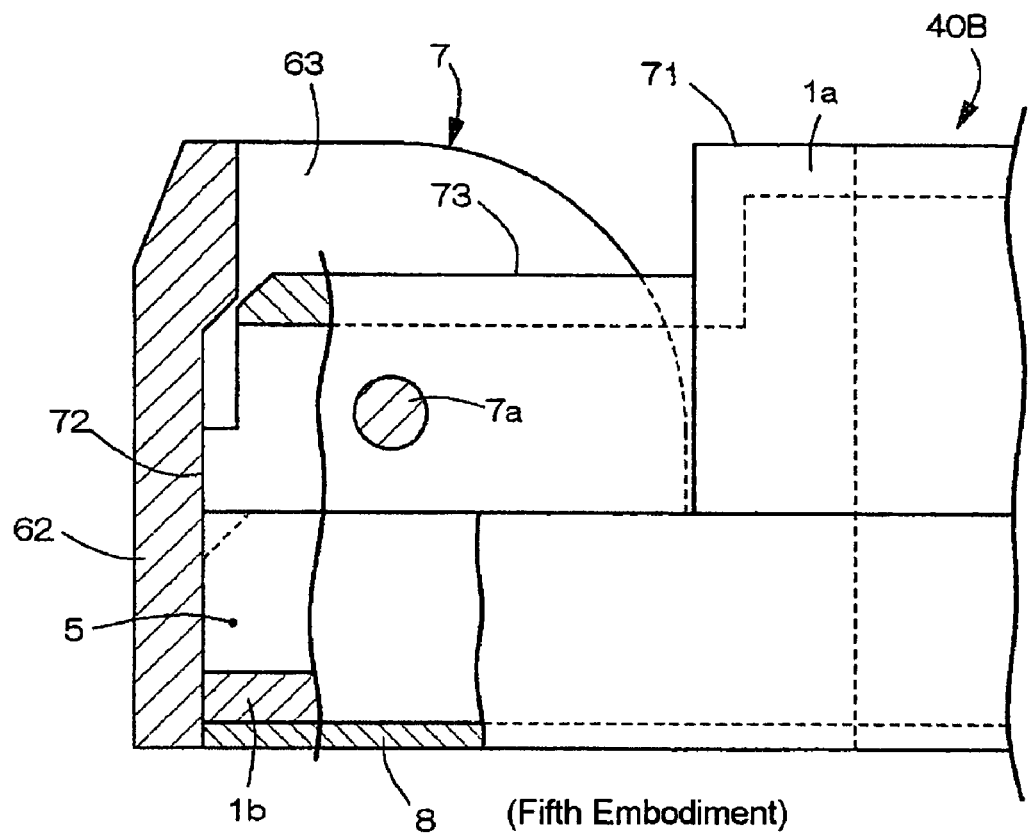
FIG. 24 is a vertical sectional side view showing a thick-type tape cartridge for use in the fifth embodiment.

FIG. 23 and FIG. 24 show a fifth embodiment obtained by modifying the fourth embodiment of the present invention. Incidentally, in FIG. 23, FIG. 23(a) shows the thin-type tape cartridge 40A according to this embodiment, FIG. 23(*b*) and FIG. 23(*c*) shows the thick-type tape cartridge 40B according to this embodiment, and FIG. 23(*d*) shows the thick-type tape cartridge 40B according to a comparative example.

In the fifth embodiment, as shown in FIGS. 23(*b*), (*c*), the attachment positions of the support shafts 7*a* of the thick-type tape cartridge 40B have been adjusted so that the projecting distances We, Wf of the pivoting front lid 7 of the thick-type tape cartridge 40B defined by a circular movement trace scribed by the front lid 7 pivoting about the support shafts 7*a* and an outer surface of the front lid 7 in the closed posture become substantially the same as the projecting distance Wd defined by the circular movement trace scribed by the front lid 7 of the thin-type tape cartridge 40A pivoting about the support shafts 7*a* as shown in FIG. 23(*a*) and the outer surface of the front lid 7 in the closed posture. Since the projecting distances We, Wf of the pivoting front lid 7 of the thick-type tape cartridge 40B are set so as to become substantially the same as the projecting distance Wc of the pivoting front lid 7 of the thin-type tape cartridge 40A in this way, the stand-by position of the reading head or the recording head in the tape drive D can be made closer to the tape cartridge 40A, 40B. Therefore, it becomes possible to restrain a depth dimension of the reading head or the recording head in the tape drive D to attain the downsizing of the tape drive D and the compactification thereof.

That is, when deciding the arrangement positions of the support shafts 7*a* of the thick-type tape cartridge 40B, for example as shown in FIG. 23(*d*), it may be considered to simply make a distance D6' from an upper end surface 71 of the upper case 1*a* to the support shaft 7*a* equal to a distance D3' from an upper end surface 71 of the upper case 1*a* in the thin-type tape cartridge 40A to the support shaft 7*a*. In this case, however, since a projecting distance Wg of the pivoting front lid 7 can't help becoming remarkably long in comparison with a projecting distance Wa in the thin-type tape cartridge 40A shown in FIG. 23(*a*), it becomes necessary to set a stand-by position of the reading head or the recording head in the tape drive D to a high level correspondingly to the projecting distance Wg in the thick-type tape cartridge 40B, which becomes a large obstacle for compactification of the tape drive D.

To the contrary, as shown in FIG. 23(*b*) and FIG. 23(*c*), when the attachment positions of the support shafts 7*a* of the thick-type tape cartridge 40B have been adjusted so that the projecting distances We, Wf of the pivoting front lid 7 of the thick-type tape cartridge 40B become substantially the same as the projecting distance Wd of the pivoting front lid 7 of the thin-type tape cartridge 40A, it becomes possible to restrain a depth dimension of the tape drive D and thus to contribute to the downsizing of the tape drive D and the compactification thereof.

Concretely, in an aspect shown in FIG. 23(*b*), a vertical distance D4 between the lower surface of the main body case 1 (the lower surface of the shutter 8) and the support shafts 7*a* and a fore and rear distance D8 between the leading end outer surface of the front lid 7 in the closed posture and the support shafts 7*a* are set to the same dimensions as the corresponding distances D3, D7 in the thin-type tape cartridge 40A shown in FIG. 24(*a*). Therefore, the projecting distance We of the pivoting front lid 7 becomes the same dimension as the projecting distance Wd in the thin-type tape cartridge 40A.

In an aspect shown in FIG. 23(*c*), a vertical distance D5 between the lower surface of the main body case 1 and the support shafts 7*a* and a fore and rear distance D9 between the leading end outer surface of the front lid 7 in the closed posture and the support shafts 7*a* are set to middle values between the corresponding distances D3, D7 in the thin-type tape cartridge 40A shown in FIG. 23(*a*) and the corresponding distances D6, D10 in the thick-type tape cartridge 40B shown in FIG. 23(*d*). Also in this case, the downsizing of the tape cartridge and the compactification thereof can be attained by making the projecting distance Wf of the pivoting front lid 7 close to the projecting distance Wd in the thin-type tape cartridge 40A. Incidentally, it is of course that the thicknesses (D4'+D4, D5'+D5, D6'+D6) of the tape cartridges 40B shown in FIG. 23(*b*) to FIG. 23(*d*) are set to the same dimension.

In aspects of the thin-type tape cartridge 40A as shown in FIG. 23(*a*) and the thick-type tape cartridge 40B as shown in FIG. 23(*d*), since the front face plate 62 in the opened posture is located above the upper end surface 71 of the main body case 1, the front face plate 62 is not brought into contact with the upper end surface 71 of the main body case 1 to enable the opening of the front lid 7 without any obstacle. To the contrary, in aspects of the thick-type tape cartridges 40B as shown in FIG. 23(*b*) and FIG. 23(*c*), since the front face plate 62 in the opened posture is lowered by such a distance that the arrangement position of the support shaft 7*a* is displaced downward, the front face plate 62 is brought into contact with the upper end surface of the main body case 1 and thus it is apprehended that the front lid 7 can't be made to pivot for opening.

Therefore, in the fifth embodiment, as shown in FIG. 24, a relief recessed portion 73 for allowing an opening movement of the front lid 7 is formed in an included angle portion between the upper end surface 71 and the front end surface 72 of the main body case 1 (the upper case 1*a*) like a stepped notch to prevent the front face plate 62 in the opened posture from being brought into contact with the upper end surface 71 of the main body case 1 so as to allow the opening pivoting of the front lid 7 without any obstacle. Since the front face plate 62 can be accommodated in the opened state in the main body case 1 with being less bulky in comparison with an aspect shown in FIG. 23(*d*), also the contribution to the compactification of the tape drive D can be attained. Incidentally, as shown in FIGS. 23(*b*), (*c*), a fore and rear dimension of the relief recessed portion 73 can be adjusted in accordance with the front face plate 62 in the opened posture.

Besides the tape cartridges described in the fourth and the fifth embodiments, the present invention can be applied to compatible tape cartridges of other types provided with the main body cases 1 having different dimensions.

Industrial Applicability

According to the present invention, even if a tape drive is operated in common for reading and recording under a condition that the tape drive of one type is loaded with each large or small tape cartridge comprising a case which is different in its thickness, it is possible to avoid a heavy accident such as a mechanical trouble, a breakage of a tape cartridge and so on.

The invention claimed is:
1. A tape drive applicable to either of a thin-type and a thick-type tape cartridges having different case thicknesses respectively in common therewith, wherein
said tape drive comprises a loading frame for receiving and supporting said tape cartridge loaded through a loading mouth and a holder for pressing and holding said tape cartridge in cooperation with said loading frame,
said loading frame comprises a bottom wall for supporting a lower surface of said tape cartridge and side walls projected from left and right ends of said bottom wall to restrain swinging of said tape cartridge in the left and right directions, said holder is vertically movable between an upper position in contact with an upper surface of said thick-type cartridge so as to press and hold said thick-type tape cartridge and a lower position in contact with an upper surface of said thin-type tape cartridge so as to press and hold said thin-type tape cartridge and is normally positioned at said upper position, a pair of upper and lower sensors provided at said side wall of the loading frame for identifying the thin-type and the thick-type tape cartridges, an effective point of the lower sensor being located below a reference height defined by the upper surface of said thin-type tape cartridge, and an effective point of the upper sensor being located above said reference height, whereby when only said lower sensor is turned ON by the tape cartridges loaded through said loading mouth, said holder is displaced from the upper position to the lower position so as to press and hold said thin-type tape cartridge for making the cartridge vertically immovable.

2. A tape drive as set forth in claim 1, wherein said cartridge has a tape loading pocket disposed in a front portion of a Main body case so as to be opened and closed by a shutter which is slidable in the fore and rear directions along the case lower surface and a front lid which is swingably supported by the main body case, a stroke distance of a pin for opening said front lid by pushing up said front lid is controlled long or short in accordance with said loaded tape cartridges based on output signals corresponding to sizes of the tape cartridges detected by said sensors.

3. A tape drive as set forth in claim 1, wherein said side wall has an entrance and an exit for a tape end detection light opened respectively, said tape drive has a tape end detection section provided with a light emitting element for radiating a detection light and a light receiving element for receiving the detection light disposed correspondingly to said entrance and said exit respectively, said tape end detection section is constructed so as to be displaced to a suitable height for said loaded tape cartridge based on the output signals corresponding to the sizes of the tape cartridges detected by said sensors.

* * * * *